United States Patent
Bashandy et al.

(10) Patent No.: US 11,438,445 B2
(45) Date of Patent: *Sep. 6, 2022

(54) PROVIDING EFFICIENCIES IN PROCESSING AND COMMUNICATING INTERNET PROTOCOL PACKETS IN A NETWORK USING SEGMENT ROUTING

(71) Applicant: Cisco Technology, Inc., San Jose, CA (US)

(72) Inventors: Ahmed Refaat Bashandy, Milpitas, CA (US); Syed Kamran Raza, Kanata (CA); Jisu Bhattacharya, San Jose, CA (US); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,610

(22) Filed: May 12, 2020

(65) Prior Publication Data
US 2020/0328971 A1    Oct. 15, 2020

Related U.S. Application Data

(63) Continuation of application No. 16/006,897, filed on Jun. 13, 2018, now Pat. No. 10,652,366.

(Continued)

(51) Int. Cl.
*H04L 29/06*    (2006.01)
*H04L 69/22*    (2022.01)
(Continued)

(52) U.S. Cl.
CPC .......... *H04L 69/22* (2013.01); *H04L 12/4633* (2013.01); *H04L 12/4641* (2013.01);
(Continued)

(58) Field of Classification Search
CPC ....... H04L 69/22; H04L 69/324; H04L 45/02; H04L 45/04; H04L 45/14; H04L 45/24;
(Continued)

(56) References Cited

U.S. PATENT DOCUMENTS 8,151,088 B1 *  4/2012  Bao ................... G06F 15/17312
                                                    712/11
9,397,931 B1    7/2016  Mohanty et al.
(Continued)

OTHER PUBLICATIONS

PCT International Search Report and Written Opinion, PCT Application PCT/US2018/039722, ISA/EP, European Patent Office, Netherlands, dated Sep. 12, 2018 (seventeen pages).
(Continued)

*Primary Examiner* — Pao Sinkantarakorn
*Assistant Examiner* — Kabir U Jahangir
(74) *Attorney, Agent, or Firm* — Polsinelli PC

(57) ABSTRACT

In one embodiment, a Segment Routing network node provides efficiencies in processing and communicating Internet Protocol packets in a network. This Segment Routing node typically advertises (e.g., using Border Gateway Protocol) its Segment Routing processing capabilities, such as Penultimate Segment Pop (PSP) and/or Ultimate Segment Pop (USP) of a Segment Routing Header (including in the context of a packet that has multiple Segment Routing Headers). Subsequently, an Internet Protocol Segment Routing packet having multiple Segment Routing Headers is received. The packet is processed according to a Segment Routing function, with is processing including removing a first one of the Segment Routing Headers and forwarding the resultant Segment Routing packet. The value of the Segments Left field in the first Segment Routing Header identifies to perform PSP when the value is one, to perform USP when the value is zero, or to perform other processing.

20 Claims, 14 Drawing Sheets

Related U.S. Application Data

(60) Provisional application No. 62/525,439, filed on Jun. 27, 2017.

(51) Int. Cl.

| | | |
|---|---|---|
| *H04L 69/324* | (2022.01) | |
| *H04L 45/00* | (2022.01) | |
| *H04L 67/10* | (2022.01) | |
| *H04L 45/02* | (2022.01) | |
| *H04L 45/50* | (2022.01) | |
| *H04L 12/46* | (2006.01) | |
| *H04L 45/74* | (2022.01) | |
| *H04L 61/5007* | (2022.01) | |
| *H04L 49/35* | (2022.01) | |
| *H04L 67/63* | (2022.01) | |
| *H04L 45/741* | (2022.01) | |
| *H04L 101/659* | (2022.01) | |
| *H04L 61/2503* | (2022.01) | |
| *H04L 43/028* | (2022.01) | |
| *H04L 9/40* | (2022.01) | |
| *H04L 45/745* | (2022.01) | |

(52) U.S. Cl.
CPC ............. *H04L 45/04* (2013.01); *H04L 45/14* (2013.01); *H04L 45/34* (2013.01); *H04L 45/50* (2013.01); *H04L 45/74* (2013.01); *H04L 45/741* (2013.01); *H04L 49/35* (2013.01); *H04L 61/2007* (2013.01); *H04L 67/10* (2013.01); *H04L 67/327* (2013.01); *H04L 69/324* (2013.01); *H04L 43/028* (2013.01); *H04L 45/745* (2013.01); *H04L 61/2503* (2013.01); *H04L 61/6059* (2013.01); *H04L 63/0272* (2013.01); *H04L 2212/00* (2013.01)

(58) Field of Classification Search
CPC ......... H04L 45/34; H04L 45/50; H04L 45/74; H04L 45/507; H04L 45/741; H04L 45/745; H04L 67/10; H04L 67/327; H04L 12/4633; H04L 12/4641; H04L 61/2007; H04L 61/2503; H04L 61/6059; H04L 49/35; H04L 43/028; H04L 63/0272; H04L 2212/00

See application file for complete search history.

(56) References Cited

U.S. PATENT DOCUMENTS

| | | | |
|---|---|---|---|
| 9,537,769 | B2 | 1/2017 | Bryant et al. |
| 9,660,897 | B1 | 5/2017 | Gredler |
| 9,762,488 | B2 | 9/2017 | Previdi et al. |
| 10,063,475 | B2 | 8/2018 | Previdi et al. |
| 10,382,334 | B2 | 8/2019 | Previdi et al. |
| 10,491,720 | B2 | 11/2019 | Brissette et al. |
| 10,506,083 | B2 | 12/2019 | Filsfils et al. |
| 10,530,873 | B1 | 1/2020 | Arya et al. |
| 10,652,366 | B2 | 5/2020 | Bashandy et al. |
| 2004/0223497 | A1 | 11/2004 | Sanderson et al. |
| 2014/0098675 | A1 | 4/2014 | Frost et al. |
| 2014/0269721 | A1* | 9/2014 | Bashandy ............... H04L 45/04 370/392 |
| 2015/0256456 | A1* | 9/2015 | Previdi ................... H04L 69/22 370/392 |
| 2015/0326675 | A1* | 11/2015 | Kini ........................ H04L 43/10 709/224 |
| 2016/0099864 | A1* | 4/2016 | Akiya ..................... H04L 45/28 370/216 |
| 2016/0173366 | A1 | 6/2016 | Saad et al. |
| 2016/0380848 | A1 | 12/2016 | Raney |
| 2017/0033939 | A1 | 2/2017 | Bragg et al. |
| 2017/0063600 | A1 | 3/2017 | Singh et al. |
| 2018/0102965 | A1 | 4/2018 | Hari et al. |
| 2018/0359176 | A1 | 12/2018 | Nainar et al. |
| 2018/0375764 | A1 | 12/2018 | Filsfils et al. |
| 2018/0375766 | A1 | 12/2018 | Filsfils et al. |
| 2018/0375768 | A1 | 12/2018 | Previdi et al. |
| 2018/0375968 | A1 | 12/2018 | Bashandy et al. |
| 2019/0215267 | A1 | 7/2019 | Filsfils et al. |
| 2019/0288940 | A1 | 9/2019 | Filsfils et al. |

OTHER PUBLICATIONS

Previdi et al., "IPv6 Segment Routing Header (SRH)," draft-ietf-6man-segment-routing-header-06, Mar. 13, 2017, The Internet Society, Reston, VA, USA (thirty-five pages).

Filsfls et al., "SRv6 Network Programming," draft-filsfils-spring-srv6-network-programming-00, Mar. 9, 2017, The Internet Society, Reston, VA, USA (forty-one pages).

Abdelsalam et al., "Implementation of Virtual Network Function Chaining through Segment Routing in a Linux-based NFV Infrastructure," arXiv.org, Apr. 20, 2017, XP055505386, DOI: arXiv:1702.05157v4, Cornell University Library, Ithaca, NY (ten pages).

Dawra et al., "BGP Signaling of IPv6-Segment-Routing-based VPN Networks," draft-dawra-idr-srv6-vpn-00.txt, Mar. 13, 2017, The Internet Society, Reston, VA, USA (twelve pages).

Filsfls et al., "SRv6 Network Programming," draft-filsfils-spring-srv6-network-programming-04, Mar. 4, 2018, The Internet Society, Reston, VA, USA (fifty-seven pages).

Filsfls et al., "Segment Routing Architecture," draft-ietf-spring-segment-routing-15, Jan. 25, 2018, The Internet Society, Reston, VA, USA (thirty-one pages).

Previdi et al., "IPv6 Segment Routing Header (SRH)," draft-ietf-6man-segment-routing-header-10, Mar. 17, 2018, The Internet Society, Reston, VA, USA (thirty-three pages).

Rekhter et al., "A Border Gateway Protocol 4 (BGP-4)," RFC 4271, Jan. 2006, The Internet Society, Reston, VA, USA (104 pages).

Bates et al., "Multiprotocol Extensions for BGP-4," RFC 2283, Feb. 1998, The Internet Society, Reston, VA, USA (nine pages).

Deering et al., "Internet Protocol, Version 6 (IPv6) Specification," RFC 2460, Dec. 1998, The Internet Society, Reston, VA, USA (thirty-nine pages).

S. Deering and R. Hinden, "Internet Protocol, Version 6 (IPv6) Specification," RFC 8200, Jul. 2017, The Internet Society, Reston, VA, USA (forty-two pages).

T. Bates et al., "Multiprotocol Extensions for BGP-4," RFC 4760, Jan. 2007, The Internet Society, Reston, VA, USA (twelve pages).

Rosen et al., "Multiprotocol Label Switching Architecture," RFC 3031, Jan. 2001, The Internet Society, Reston, VA, USA (sixty-one pages).

"Information technology—Telecommunications and information exchange between systems—Intermediate System to Intermediate System intra-domain routeing information exchange protocol for use in conjunction with the protocol for providing the connectionless-mode network service (ISO 8473)," Second Edition, Nov. 15, 2002, ISO/IEC 2002, Switzerland (210 pages).

* cited by examiner

PROVIDING EFFICIENCIES IN PROCESSING AND COMMUNICATING INTERNET PROTOCOL PACKETS IN A NETWORK USING SEGMENT ROUTING

CROSS-REFERENCE TO RELATED APPLICATIONS

This application is a continuation of U.S. patent application Ser. No. 16/006,897, filed Jun. 13, 2018, with priority to U.S. Provisional Application No. 62/525,439, filed Jun. 27, 2017, both of which are hereby incorporated by reference in their entirety.

TECHNICAL FIELD

The present disclosure relates generally to processing and sending of Internet Protocol packets in packet network, such as, but not limited to, adding and communicating packets according to a Segment Routing Policy.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packets are typically forwarded in a network based on one or more values representing network nodes or paths.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
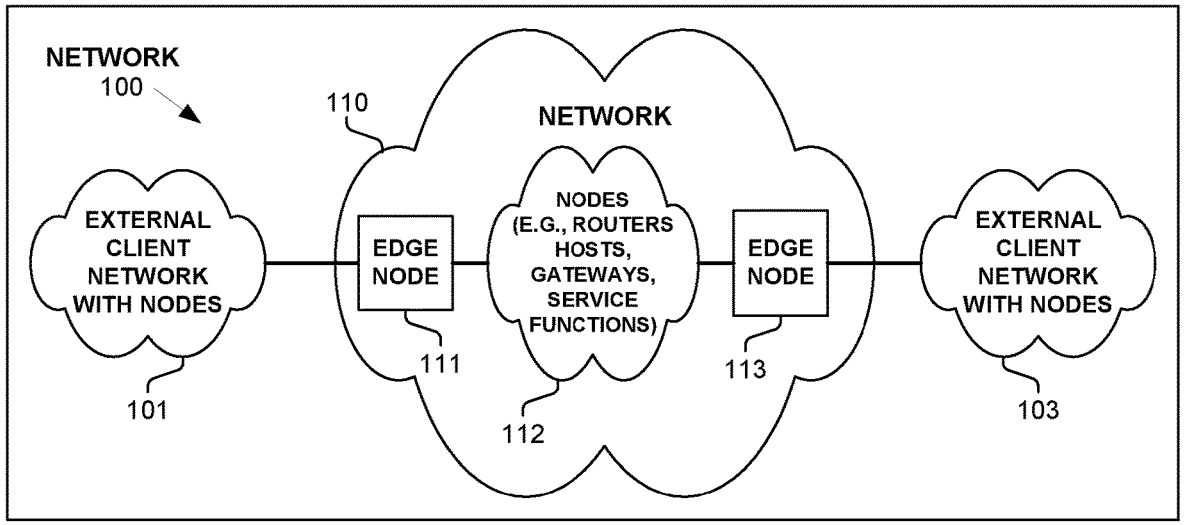
FIG. 1A illustrates a network operating according to one embodiment.

Disclosed are, inter alia, methods, apparatus, computer-storage media, mechanisms, and means associated with providing efficiencies in processing and communicating Internet Protocol packets in a network using Segment Routing.

In one embodiment, a particular packet is received by a particular node in a network, with the particular packet including an outer Internet Protocol version 6 (IPv6) header that includes a Destination Address. The received particular packet is updated according to a particular Segment Routing Policy identified based on the particular packet. The particular Segment Routing Policy includes an ordered list of Segment Identifiers comprising, in first-to-last order, a first Segment Identifier followed by one or more subsequent Segment Identifiers. The updating of the particular packet includes setting the Destination Address to the first Segment Identifier, and adding said one or more subsequent Segment Identifiers, but not the first Segment Identifier, in a first Segment Routing Header. The updated particular packet is sent into the network without the first Segment Identifier being added to a Segment Routing Header in response to the Segment Routing Policy.

In one embodiment, a particular Internet Protocol (IP) packet is received by a network node in a network. The particular IP packet is updated by the network node to include a particular Segment Routing Policy, with the Segment Routing Policy including an ordered list of Segment Identifiers that will be traversed by the particular IP packet. This ordered list comprises, in first-to-last order, a first Segment Identifier followed by one or more subsequent Segment Identifiers. This updating includes: adding said one or more subsequent Segment Identifiers to a first Segment Routing Header that is an IP Extension header of the particular IP packet; and setting the Destination Address of the outer IP header of the particular IP packet to the first Segment Identifier; while not including adding the first Segment Identifier to any Segment Routing header of the particular IP packet. The updated particular IP packet is sent from the network node into the network.

In one embodiment, the received packet is a Segment Routing packet. In one embodiment, the received particular packet is an IPv6 packet, but not a Segment Routing packet. In one embodiment, updating the particular IP packet includes adding the value, when the particular packet was said received by the particular node, of the Destination Address as a Segment Identifier in a Segment Routing Header of the particular IP packet that is the next in Segment Identifier processing order for said updated particular IP packet after said one or more subsequent Segment Identifiers. In one embodiment, the received particular packet is an IPv6 Segment Routing packet including a particular Segment Routing Header; and wherein said updating the particular packet includes inserting the first Segment Routing Header in the particular packet between the outer IPv6 header and the particular Segment Routing Header, and increasing the Segments Left value by one in the particular Segment Routing Header.

One embodiment, includes a method, comprising: receiving a particular Segment Routing (SR) packet by a particular node in a network, wherein as received, the particular SR packet includes: an outer Internet Protocol (IP) header with an IP Destination Address having a value of a particular IP address of the particular node, a first SR Header (SRH), and a second SRH, with the first SRH including a first Segments Left value and a first Segment List including a particular Segment Identifier having a value of the particular IP address, and with the second SRH including a second Segments Left value of at least one and a second Segment List including one or more second Segment Identifiers; and particular processing of the particular SR packet by the particular node, with said particular processing including removing the first SRH and updating the IP Destination Address to a specific Segment Identifier resulting in the particular SR packet being sent from the particular node with the outer IP header and the second SRH and without the first SRH.

In one embodiment, when the particular SR packet is received by the particular node, the first Segments Left value is one and the first Segment List includes the specific Segment Identifier identified at a position identified by the first Segments Left value; and wherein said updating the IP Destination Address acquires the specific Segment Identifier from the first Segment List. In one embodiment, the particular node advertises to one or more other nodes in the network a particular route associated with the particular IP address and the capability of the Segment Routing capability of Penultimate Segment Pop (PSP) of a SRH. In one embodiment, said advertising is performed using Border Gateway Protocol (BGP).

In one embodiment, when the particular SR packet is received by the particular node, the first Segments Left value is zero and the second Segment List includes the specific Segment Identifier identified at a position identified by the second Segments Left value; and wherein said updating the IP Destination Address acquires the specific Segment Identifier from the second Segment List. In one embodiment, the particular node advertises to one or more other nodes in the network a particular route associated with the particular IP address and the capability of the Segment Routing capability of Ultimate Segment Pop (USP) of a SRH. In one embodiment, said advertising is performed using Border Gateway Protocol (BGP).

2. Description

Disclosed are, inter alia, methods, apparatus, computer-storage media, mechanisms, and means associated with providing efficiencies in processing and communicating Internet Protocol packets in a network using Segment Routing.

As used herein Segment Routing includes using Internet Protocol Version 6 (IPv6) addresses as Segment Identifiers (SIDs); in other words, as used herein, Segment Routing includes IPv6 Segment Routing (SRv6). As used herein, a Segment Routing node refers to a network node (e.g., router, server, appliance) that performs Segment Routing functionality, including, but not limited to, adding, updating, or removing a Segment Routing Header; performing a Segment Routing function identified by a Segment Identifier that is the IP Destination Address of an IP packet or is a Segment Identifier in a Segment Routing Header. Also, as used herein, an IP packet may or not be a Segment Routing Packet; but a Segment Routing packet is an IP packet.

The term "outer IP header" of a packet refers to the IP header (not an Extension header) used in processing and forwarding of the packet, and does not refer to a header of a packet encapsulated (e.g., in the payload) of the packet. The term "IP Destination Address" refers to the value of the IP Destination Address field of the outer IP header. The phrase "wherein the value, when the particular packet was said received by the particular node, of the Destination Address" refers to IP Destination Address of the packet when the packet was received by the particular node, which may or may not be the same as the IP Destination Address of the packet when sent from the particular node.

The terms "node" or "network node" are used herein to refer to a router or host. The term "route" is used herein to refer to a fully or partially expanded prefix/route (e.g., 10.0.0.1 or 10.0.*.*), which is different than a "path" through the network which refers to a nexthop (e.g., next router) or complete path (e.g., traverse router A then router B, and so on). Also, the use of the term "prefix" without a qualifier herein refers to a fully or partially expanded prefix. Also, as used herein, "forwarding information" includes, but is not limited to, information describing how to process (e.g., forward, send, manipulate, modify, change, drop, copy, duplicate, receive) corresponding packets. In one embodiment, determining forwarding information is performed via an ingress lookup operation and an egress lookup operation. Also, the term "processing" when referring to processing of a packet process refers to a broad scope of operations performed in response to a packet, such as, but not limited to, forwarding/sending, dropping, manipulating/modifying/changing, receiving, duplicating, creating, applying one or more service or application functions to the packet or to the packet switching device (e.g., updating information), etc. Also, as used herein, the term processing in "parallel" is used in the general sense that at least a portion of two or more operations are performed overlapping in time.

As described herein, embodiments include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

FIG. 1A illustrates a network 100 (e.g., an aggregation of one or more networks of one or more different entities) operating according to one embodiment. As shown, network 100 includes client networks 101 and 103 (which are the same network in one embodiment) communicatively coupled to Segment Routing (SR) provider network 110. In one embodiment, each of client networks 101 and 103 include hosts (e.g., end nodes) with upper-layer applications that communicate via network 100. In one embodiment, some of the hosts in client network 101 and/or 103 are SR-capable in that they can generate and process Segment Routing packets.

In one embodiment, Segment Routing network 110 (e.g., a provider network) includes Segment Routing edge nodes 111 and 113, and a network 112 of network nodes including SR-capable routers (and possibly some that are not SR-capable in that they do not process a Segment Routing header/complete Segment Identifier), SR gateways, service functions, and hosts (e.g., end nodes). In one embodiment, SR edge nodes 111 and 113 process packets received from networks 101 and 103, which may include encapsulating or otherwise processing these packets into SR packets such as by adding a SR header (and possibly another IP header) to these packets according to a data plane ascertained Segment Routing policy, and subsequently decapsulating or removing a Segment Routing header (and possibly another IP header) and forwarding the native (Segment Routing or IP) packets into network 101 and 103.

In one embodiment and in response to receiving a packet, a Segment Routing edge node 111, 113 and/or a Segment Routing node within network 112 determines a Segment Routing policy (e.g., list of complete Segment Identifiers) through and/or to which to forward a Segment Routing packet encapsulating the native packet. These policies can change in response to network conditions, network programming, etc. In one embodiment, the Segment Routing policy specifies to add one or more SR headers, each with one or more Segment Identifiers, resulting in a Segment Routing packet having one or more Segment Routing headers. In one embodiment, a native packet is received without a Segment Routing header (possibly with an IP Destination Address that is a Segment Identifier/IP address of the receiving Segment Routing node), and the Segment Routing node encapsulates the native packet in a Segment Routing packet including one or more added Segment Routing headers, each including one or more Segment Identifiers. In one embodiment, a Segment Routing packet is received with a Segment Routing header, and with Segment Routing node adding one or more Segment Routing headers resulting in a Segment Routing packet including one or more added Segment Routing headers, each including one or more Segment Identifiers. In contrast, and for each of these scenarios a single Segment Routing header could have been used that includes all of the Segment Identifiers.

Figure 1B:
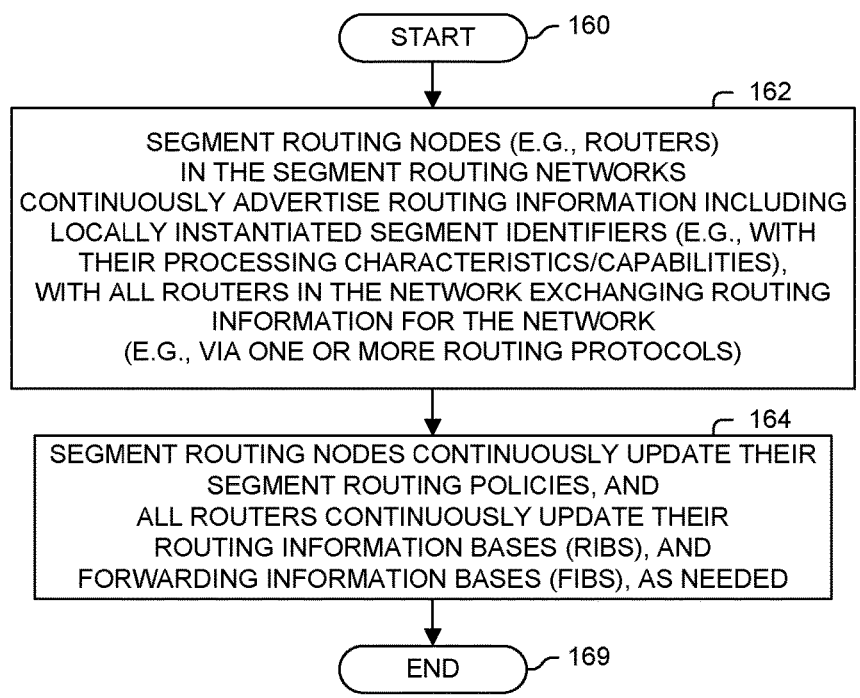
FIG. 1B illustrates a process according to one embodiment.

FIG. 1B illustrates a process according to one embodiment associated with providing efficiencies in processing and communicating Internet Protocol packets in a network using Segment Routing. Processing begins with process block 160. In process block 162, routers in the networks continuously advertise and exchange routing information including Segment Routing information (e.g., routes including Segment Identifiers of network nodes and their corresponding function or function/arguments, attributes of Segment Identifiers, attributes of node, Segment Routing capabilities including, but not limited to Penultimate Segment Pop (PSP) of a SRH and/or Ultimate Segment Pop (USP) of a SRH) and other routing information (e.g., IPv4 or IPv6 topology information) typically via one or more routing protocols (e.g., using Border Gateway Protocol/ "BGP") and/or other protocols. In process block 164, Segment Routing and other network nodes continuously update their Segment Routing policies and routing/forwarding information as required (e.g., based on information received via a routing or other protocol, from a network management system, etc.). Processing of the flow diagram of FIG. 1B is complete as indicated by process block 169.

Figure 2A:
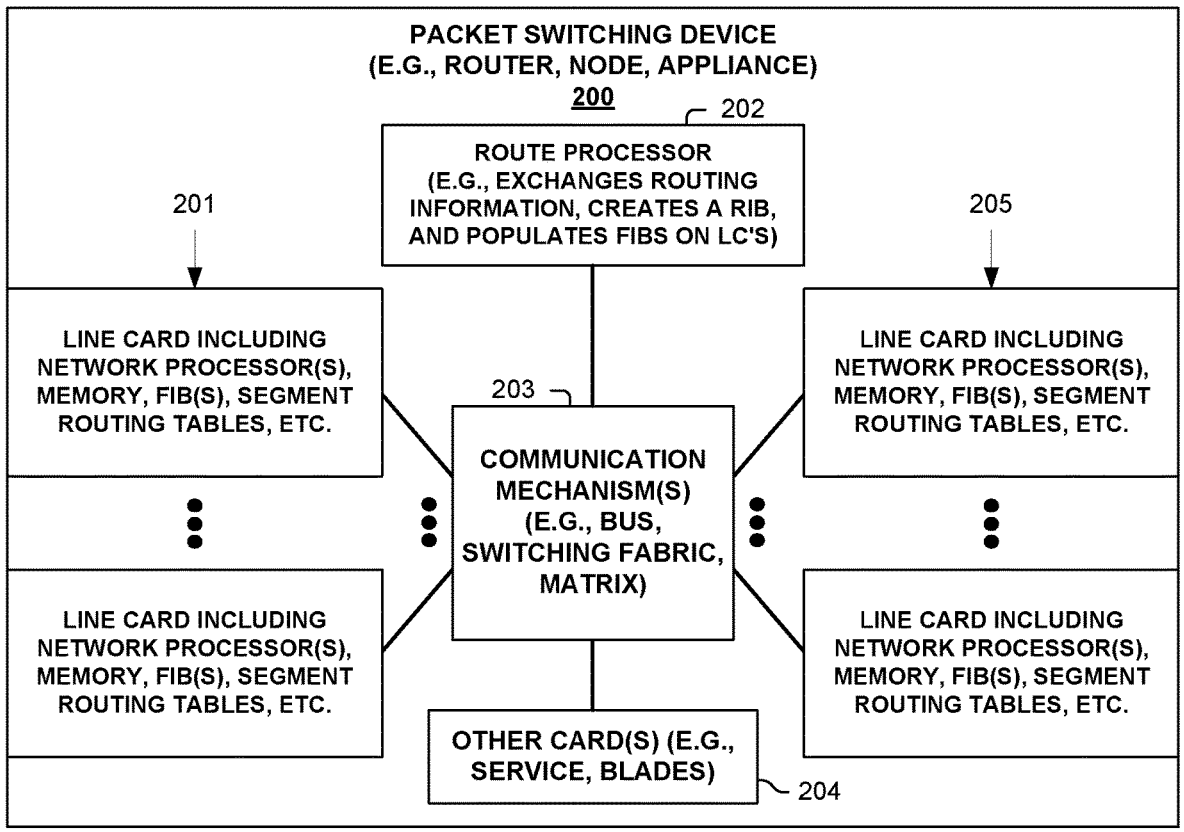
FIG. 2A illustrates a packet switching device according to one embodiment.
Figure 2B:
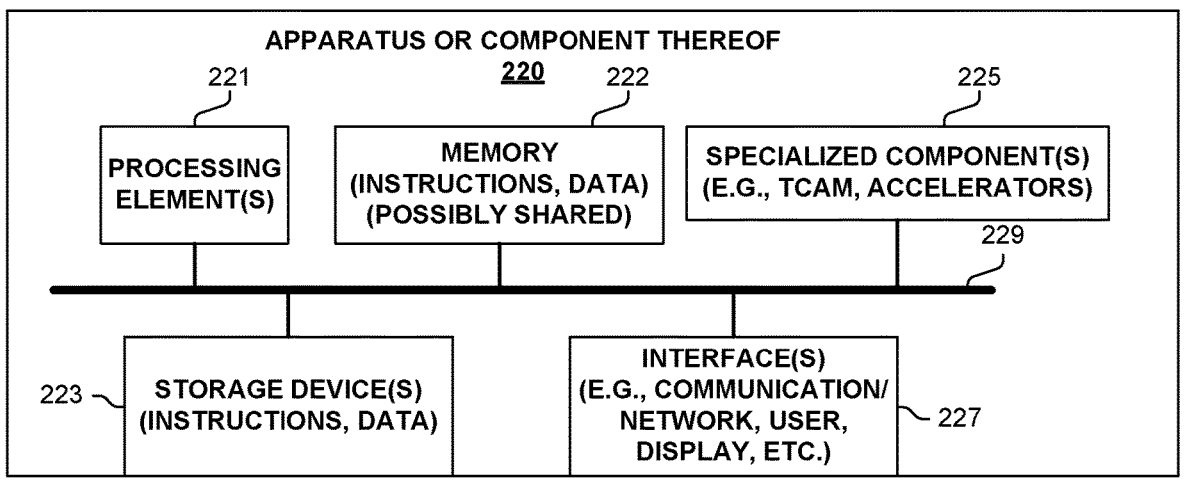
FIG. 2B illustrates an apparatus according to one embodiment.

FIGS. 2A-B and their discussion herein provide a description of various network nodes according to one embodiment.

FIG. 2A illustrates one embodiment of a packet switching device 200 (e.g., router, node, appliance, gateway) according to one embodiment. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with providing efficiencies in processing and communicating Internet Protocol packets in a network using Segment Routing. Packet switching device 200 also has a control plane with one or more processing elements (e.g., Route Processor(s)) 202 for managing the control plane and/or control plane processing of packets associated with providing efficiencies in processing and communicating Internet Protocol packets in a network using Segment Routing. Packet switching device 200 also includes other cards 204 (e.g., service cards, blades) which include processing elements that are used in one embodiment to process (e.g., forward/send, drop, manipulate, change, modify, receive, create, duplicate, perform SR functionality possibly with shared memory with one or more service functions, apply a service according to one or more service functions) packets associated with providing efficiencies in processing and communicating Internet Protocol packets in a network using Segment Routing, and some hardware-based communication mechanism 203 (e.g., bus, switching fabric, and/or matrix, etc.) for allowing its different entities 201, 202, 204 and 205 to communicate. Line cards 201 and 205 typically perform the actions of being both an ingress and egress line card, in regards to multiple other particular packets and/or packet streams being received by, or sent from, packet switching device 200. In one embodiment, Segment Routing functions are implemented on line cards 201, 205.

FIG. 2B is a block diagram of an apparatus 220 (e.g., host, router, node, destination, or portion thereof) used in one embodiment associated with providing efficiencies in processing and communicating Internet Protocol packets in a network using Segment Routing. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly shared memory), storage device(s) 223, specialized component(s) 225 (e.g. optimized hardware such as for performing lookup, packet processing (including Segment Routing processing) and/or service function operations; associative memory; binary and/or ternary content-addressable memory; Application Specific Integrated Circuit(s), etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/ computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3A:
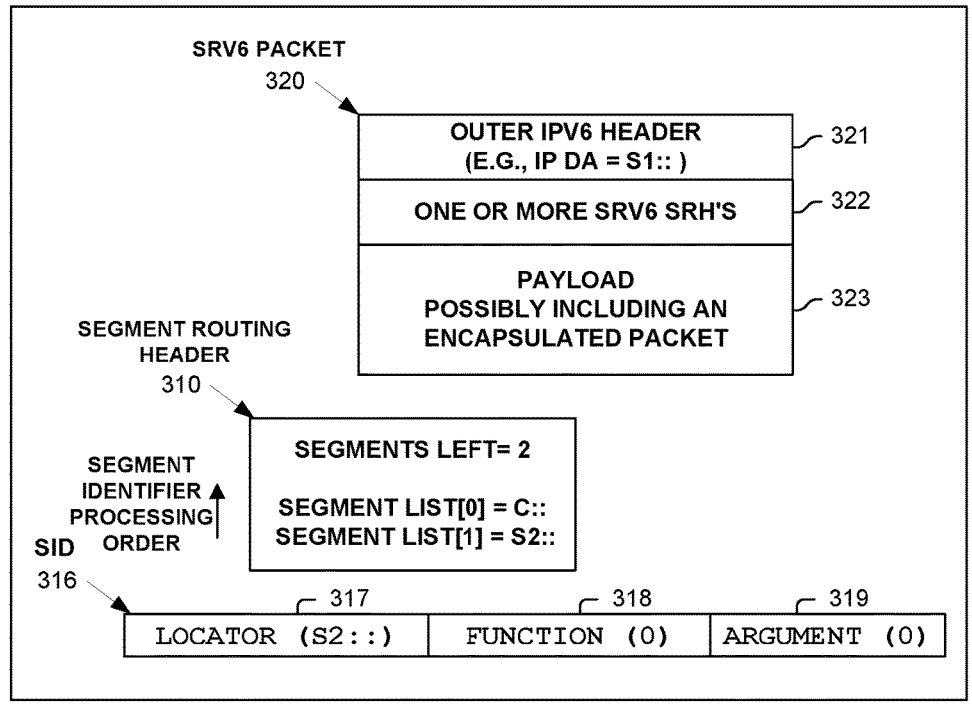
FIG. 3A illustrates a Segment Routing packet according to one embodiment.

FIG. 3A illustrates a SRv6 packet 320 according to one embodiment. As shown, SRv6 packet 320 includes an outer IPv6 header 321 (which, as shown, includes a Destination Address of value S1::, and other values/fields), one or more Segment Routing headers 322, and a payload field 323 that typically includes application data, encapsulated packets, and/or other values. As shown, Segment Routing header 310 includes a Segment List with two ordered Segment List elements (each storing a Segment Identifier that is an IPv6 address) with values of Segment Identifiers C:: and S2::, and with Segments Left having a value of two [2].

One embodiment improves processing and network efficiencies by not including redundant Segment Routing/forwarding information in a packet, albeit in violation of standardized Segment Routing requirements. One embodiment, in creating a Segment Routing Packet or modifying a Segment Routing Packet (e.g., to add one or more Segment Identifiers of a Segment Routing Policy), does not include in the Segments List the first sixteen-byte Segment Routing Identifier of this Segment Routing Policy—as the IP Destination Address of the packet being create or modified is set to this sixteen-byte value. Any additional Segment Routing Identifier(s) of the Segment Routing Policy are added to the Segments List to be processed in order. Also, the value of the Segments Left is set to a value equal (or possibly greater) than the number of Segment Identifiers in the Segment List, in order to communicate to a receiving Segment Routing node that the current Segment Identifier of the Segment Routing Policy is not included in the Segment List, but rather only as the IPv6 Destination Address (e.g., S1:: in outer IPv6 header 321).

In one embodiment, for a Segment Routing Policy with n+1 Segment Identifiers, the processing/traversal order of these Segment Identifiers is the first Segment Identifier in the Destination Address of the outer IP header, followed by the n Segment Identifiers stored in the n Segment List elements.

In a Segment List with n Segment List elements (each storing a Segment Identifier), the processing/traversal order proceeds from Segment List element [n−1] at the bottom of the Segment List (furthest from the beginning of its Segment Routing header) to Segment List element [0] at the top of the Segment List (closest to the beginning of its Segment Routing header). Segments Left identifies a Segment List element in the Segment List (e.g., a segments left value of zero identifies the Segment Identifier at the top of the Segment List and identifies a Segment Identifier above all other Segment Identifiers in the Segment List), or a Segment Identifier not in the Segment List but only stored as the IP Destination address in the packet.

Also shown in FIG. 3A and according to one embodiment, Segment Identifier (SID) 316 includes locator 317 with a value of S2::, function 318 with a value of zero, and argument 319 of zero. A non-zero value of function 318 (with a zero or non-zero or argument 319) is typically used in a network to identify a Segment Routing function that will cause corresponding processing to be performed.

Figure 3B:
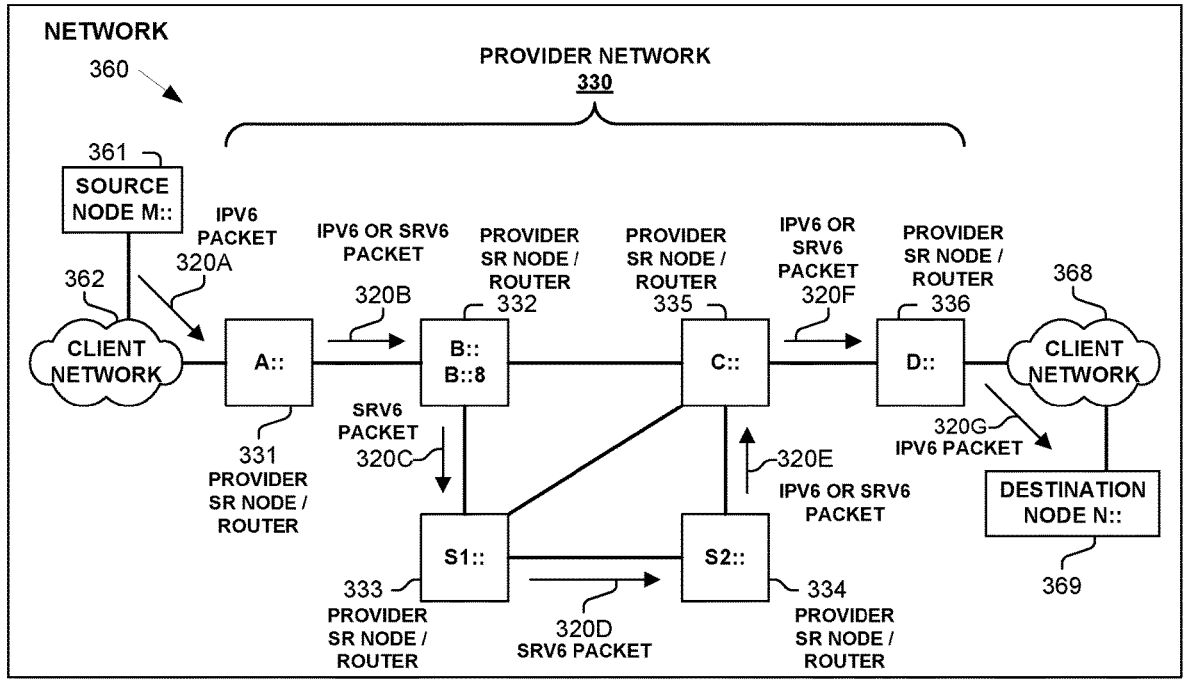
FIG. 3B illustrates a network operating according to one embodiment.

FIG. 3B illustrates a network 360 operating according to one embodiment. Network 360 includes client network 362 (with source node 361 having an IPv6 address of M::) and client network 368 (with destination node 369 having an IPv6 address of N::). Network 360 also includes provider network 330, that includes provider nodes 331-336 (e.g., Segment Routing routers). SR Router 331 has an IPv6 address of A::, SR Router 332 has IP Addresses of B:: and B::8, SR Router 333 has an IPv6 address of S1::, SR Router 334 has an IPv6 address of S2::, SR Router 335 has an IPv6 address of C::, and SR Router 336 has an IPv6 address of D::. Each Router 331-336 typically advertises all of their IP addresses using a routing or other protocol.

FIG. 3B shows packet 320 (denoted 320A, 320B, 320C, 320E, 320F, and 320G) being communicated in network 360 from source node 361 to destination node 369. Even though packet 320 is modified in network 360 by a network node 331-336, packet 320 (320A-G) is still considered a same packet.

As shown in FIG. 3B, source node 361 sends an IPv6 packet 320A with a Destination Address of N:: into client network 362. Packet 320 A is received by SR node 331, which sends IPv6 or SRv6 packet 320B to SR node 332, that sends SRv6 packet 320C to SR node 333, that sends SRv6 packet 320D to SR node 334, that sends SRV6 packet 320E to SR node 335, that sends SRv6 or IPv6 packet 320F to SR node 336, that sends IPv6 packet 320G to client network 368 which routes it to destination node 369.

The figures subsequent to FIG. 3B herein often refer to a particular version of the packet 320A-320G shown in FIG. 3B to provide context, such as for, but not limited to, the changing of a received non-Segment Routing IPv6 packet in a SRv6 packet.

Figure 4:
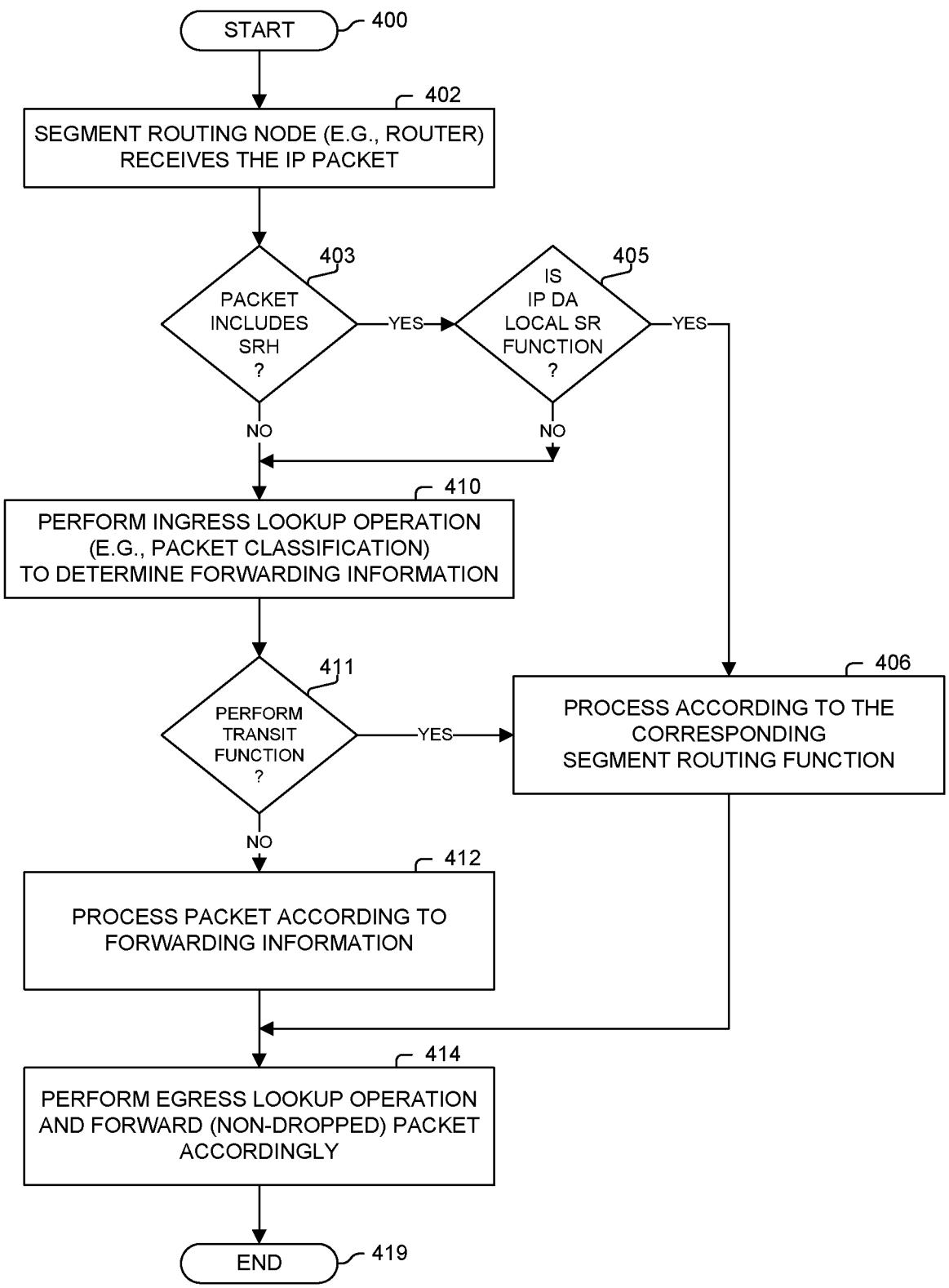
FIG. 4 illustrates a process according to one embodiment.

FIG. 4 illustrates a process according to one embodiment. Processing begins with process block 400. In process block 402, a Segment Routing node (e.g., router) receives an IP packet. As determined in process block 403, if the packet includes a Segment Routing Header (SRH), then processing proceeds to process block 405; otherwise processing proceeds to process block 410. As determined in process block 405, if the IP Destination Address is a Segment Identifier referring to a local Segment Routing function, then processing proceeds to process block 406; otherwise processing proceeds to process block 410.

Continuing in process block 410, an ingress lookup operation (e.g., packet classification) is performed to determine forwarding information for the received packet. As determined in process block 411, if the forwarding information defines to perform a transit Segment Routing function (e.g., the IP Destination Address is not an IP address of the node and the forwarding information determines to perform a Segment Routing function), then processing proceeds to process block 406; otherwise processing proceeds to process block 412.

Continuing in process block 406, the packet is processed according to the corresponding Segment Routing function, and processing proceeds to process block 414.

Continuing in process block 412, the packet is processed according to the identified forwarding information, and processing proceeds to process block 414.

Continuing in process block 414, an egress lookup operation is performed to identify forwarding information, with the processed packet (e.g., that was not dropped by such processing) is forwarded accordingly. Processing of the flow diagram of FIG. 4 is complete as indicated by process block 419.

Figure 5A:
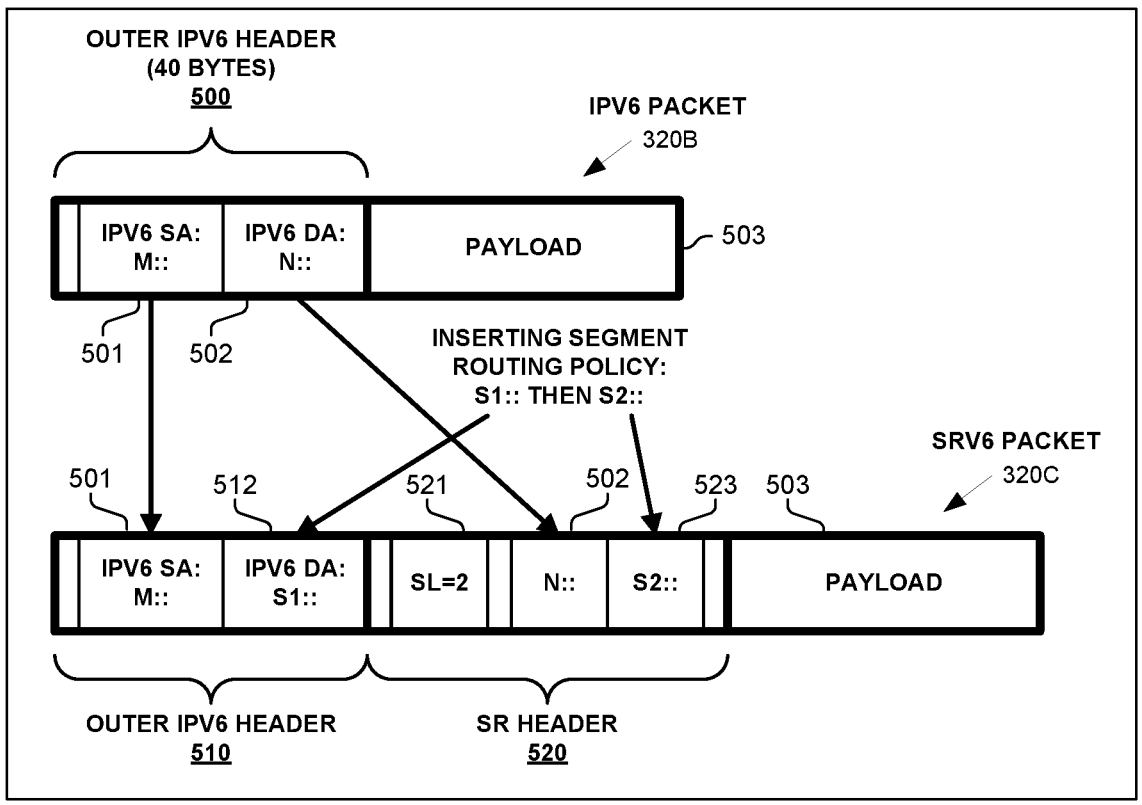
FIG. 5A illustrates packet processing of a packet according to one embodiment.

FIG. 5A illustrates Segment Routing packet processing of IPv6 packet 320B (with outer IPv6 header 500) according to one embodiment. In response to receiving packet 320B, a Segment Routing Policy of Segment Identifiers S1:: then S2:: is identified and added to IPv6 packet 320B resulting in SRv6 packet 320C. SRv6 packet 320C has the same IP Source 501 address, has its Destination Address (in outer IPv6 header 510) set to the first Segment Identifier 512, and has the same payload 503. Additionally, Segment Routing Header 520 is added including in traversing order Segment Identifier S2:: (523) from the Segment Routing Policy), and Segment Identifier N:: (502) from the Destination Address 502 of received IPv6 packet 320B. Segments Left 521 is set to two (as there are two Segment Identifiers in SR header 520) indicating that the next Segment Identifier is only stored as Destination Address 512, and not in Segment Routing Header 520. Note, Segment Routing node 333 of FIG. 3B having IP address S1:: will receive packet 320C, and in response, will decrease Segments Left 521 by one, thus pointing to Segment Identifier S2:: (523).

Figure 5B:
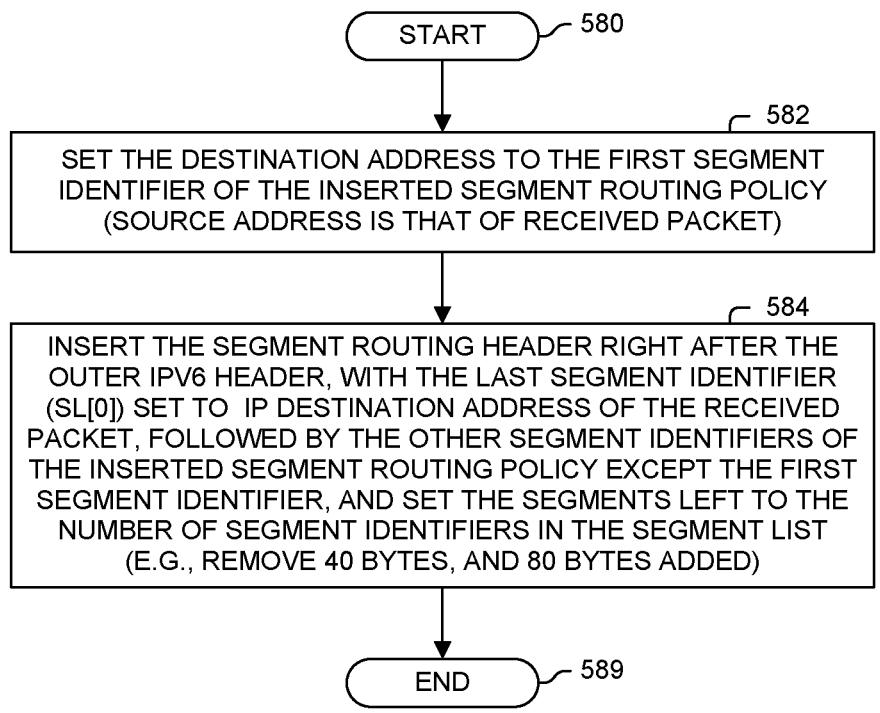
FIG. 5B illustrates a process according to one embodiment.

FIG. 5B illustrates a process according to one embodiment. Processing begins with process block 580. In process block 582, the Destination Address of the received packet is updated to that of the first Segment Identifier of the Segment Routing Policy being inserted (with the Source Address remaining the same), but this Segment Identifier is not included in the SR Header being inserted in the received packet. In process block 584, a SR Header is inserted right after the outer IP header, with the last Segment Identifier set to the Destination Address of the received packet. The remaining Segment Identifiers of the Segment Routing Policy are accordingly included in the SR Header, with its Segments Left to the number of Segment Identifiers in the SR Header. Processing of the flow diagram of FIG. 5B is complete as indicated by process block 589.

Figure 6A:
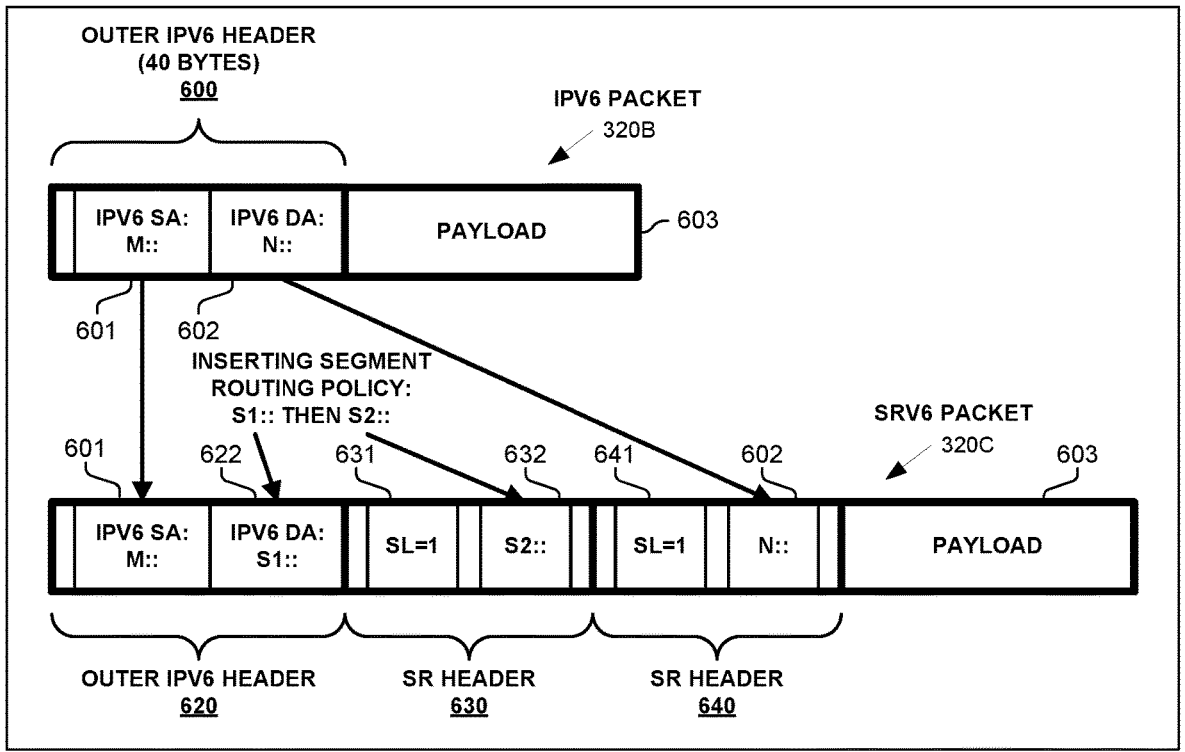
FIG. 6A illustrates packet processing of a packet according to one embodiment.

FIG. 6A illustrates Segment Routing packet processing of a received IPv6 packet 320B according to one embodiment. This processing is similar to that illustrated in FIG. 5A, but uses two SR Headers 630, 640.

In response to receiving packet 320B, a Segment Routing Policy of Segment Identifiers S1:: then S2:: is identified and added to IPv6 packet 320B resulting in to SRv6 packet 320C. SRv6 packet 320C has the same IP Source 601 address, has its Destination Address (in outer IPv6 header 610) set to the first Segment Identifier 622, and has the same payload 603.

SR Header 640 is added with the single Segment Identifier 602 copied from Destination Address 602 of received IPv6 packet 320B. Segments Left is set to one (the number of Segment Identifiers in SR Header 640) as the current Segment Identifier is not in the Segment List of SR Header 640.

SR Header 630 (which will be completely processed prior to SR Header 640) is added including Segment Identifier S2:: (632) from the Segment Routing Policy. Segments Left 631 is set to one as the current Segment Identifier (S1::) is only included in IP Destination Address 622, and not in SR Header 630. One embodiment has more Segment Identifiers in the Segment Routing Policy being added, with these additional Segment Identifiers included in SR Header 630 and Segments Left 631 increased accordingly.

Note, in response to receiving packet 320C, Segment Routing node 333 of FIG. 3B having IP address S1:: will decrease Segments Left 631 by one, thus pointing to Segment Identifier S2:: (632).

Figure 6B:
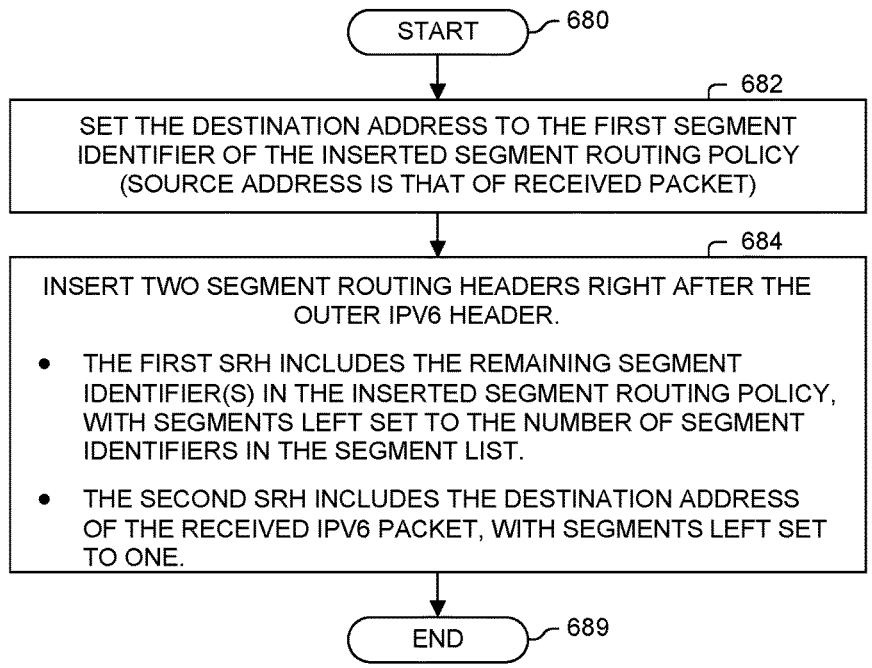
FIG. 6B illustrates a process according to one embodiment.

FIG. 6B illustrates a process according to one embodiment. Processing begins with process block 680. In process block 682, the Destination Address of the packet is set to the first Segment Identifier of the Segment Routing Policy being inserted (with the Source Address remaining the same), but this Segment Identifier is not included in a SR Header being inserted in the received packet.

In process block 684, two SR Headers (which are IP Extension headers) are inserted into the packet right after the outer IP header. The first SR Header includes the remaining Segment Identifiers of the Segment Routing Policy being inserted in the packet, with its Segments Left set to this number of Segment Identifiers. A second SR Header is added to the packet with the single Segment Identifier of the Destination Address of the received packet, and with its Segments Left set to one. Processing of the flow diagram of FIG. 6B is complete as indicated by process block 689.

Figure 6C:
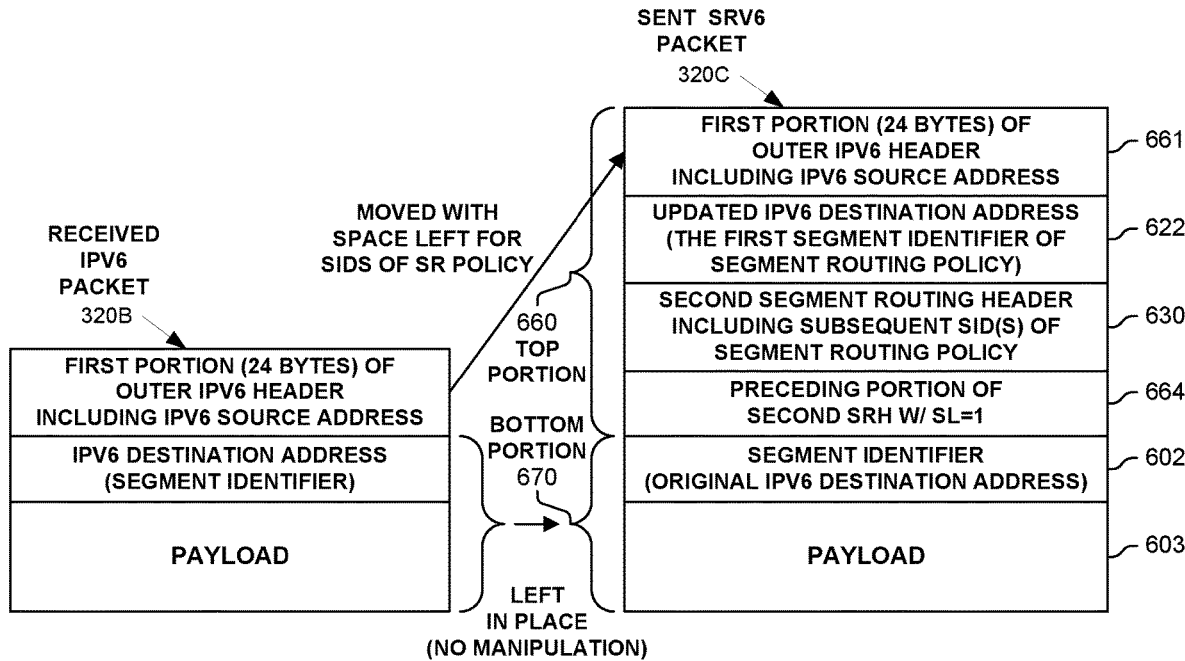
FIG. 6C illustrates packet processing of a packet according to one embodiment.

FIG. 6C illustrates Segment Routing packet processing of a received IPv6 packet 320B according to one embodiment resulting in SRv6 packet 320, which is the same packets shown in FIG. 6A. The Segment Routing packet processing expressly shown in FIG. 6C includes optimizations to reduce and/or minimize the number of processing cycles required.

In one embodiment, received IPv6 packet 320 is stored in contiguous memory locations. Bottom portion 670, from the Destination Address through payload 306 of received packet 320B remains in place, with this Destination Address being the single Segment Identifier in the second SR Header. The first portion (e.g., twenty-four bytes) of received packet 320B is moved in memory to location 661 to provide space for the added Segment Routing Policy in two SR Headers (denoted top portion 660). The remaining fields of top portion 660 are populated as follows: the first Segment Identifier of the Segment Routing Policy being added is placed in location 622 (the Destination Address field of SRv6 packet 320C); the second SR Header 630 (as described in relation to FIG. 6A) that includes the remaining Segment Identifiers of the Segment Routing Policy and Segments Left set to the number of these Segment Identifiers; and preceding portion 664 of the second SR Header 640 (of FIG. 6A) with the remainder of the second SR Header 640 being Segment Identifier 602 (the remaining in place Destination Address of received packet 320B).

Further, as values (and sizes thereof) inserted in fields/locations 622, 630, 644 for a particular Segment Routing Policy do not change for different packets, this information can be pre-stored in a scratchpad or other memory space and directly copied into packets. This size also determines where the first portion 661 (e.g., twenty-four bytes) of the received packet is block moved.

Figure 6D:
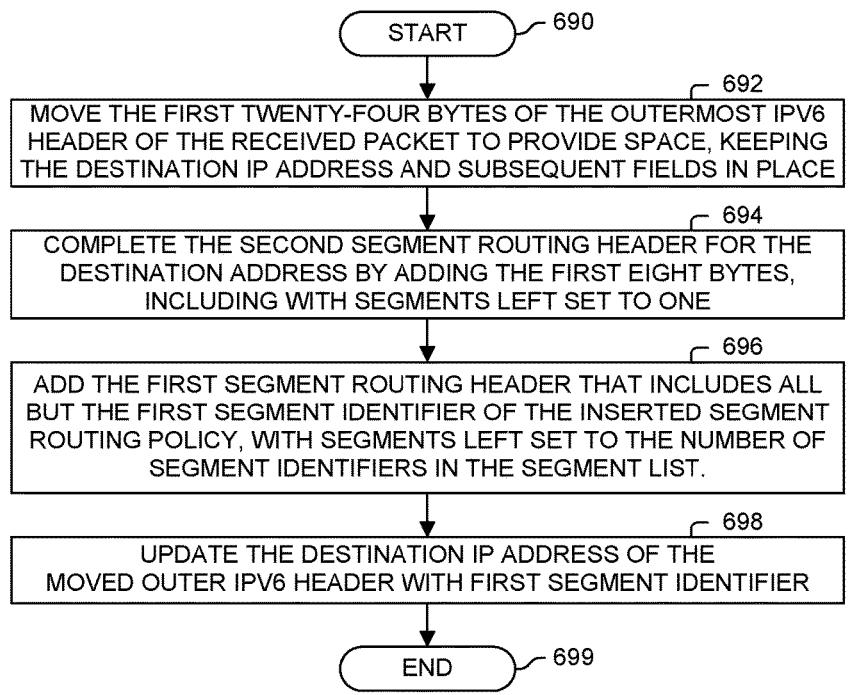
FIG. 6D illustrates a process according to one embodiment.

FIG. 6D illustrates a process according to one embodiment. Processing begins with process block 690. In process block 692, the first twenty-four bytes of the outer IPv6 header of the received packet is moved to provide space to insert SR Header information, with the Destination Address to become part of the second SR Header. In process block 694, the second SR Header is completed by adding its first eight bytes. In process block 696, the first SR header is added with the remaining Segment Identifiers of the added Segment Routing Policy. In process block 698, the Destination Address of the SRv6 packet to be sent is updated with the first Segment Identifier of the added Segment Routing Policy. In one embodiment, the processing of process blocks 694-698 is performed in a single block memory update. Processing of the flow diagram of FIG. 6D is complete as indicated by process block 699.

Figure 7A:
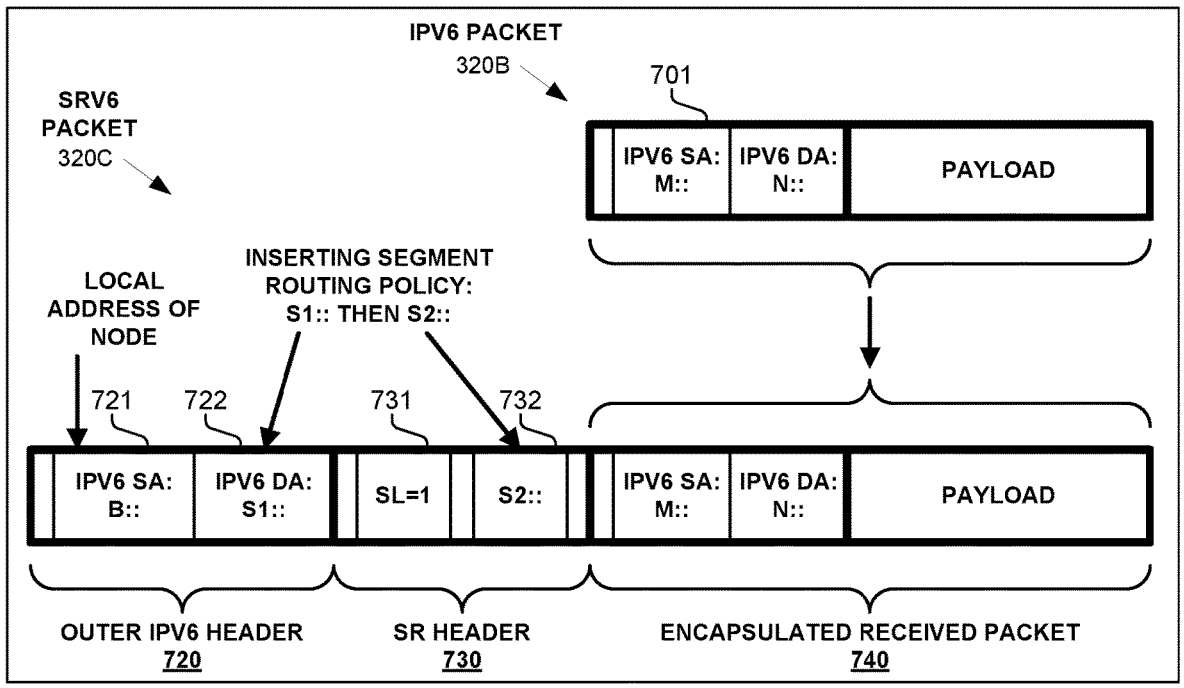
FIG. 7A illustrates packet processing of a packet according to one embodiment.

FIG. 7A illustrates packet processing of a received IPv6 packet 320B according to one embodiment to encapsulate the received packet in SRv6 packet 320C. Outer IPv6 header of SRv6 packet 320C includes as Source Address 721 that is a local address of the node (e.g., B:: of node 332 of FIG. 3B) processing received packet 320B as shown and then sending packet 320C; and Destination Address 722 from the first Segment Identifier of the Segment Routing Policy being added. SR Header 730 of SRv6 packet 320C includes the remaining one or more Segment Identifiers 732 from the added Segment Routing Policy, with Segments Left 731 set to the number of these Segment Identifiers; and received IPv6 packet 320B as its payload 740 (e.g., the received packet encapsulated therein).

Figure 7B:
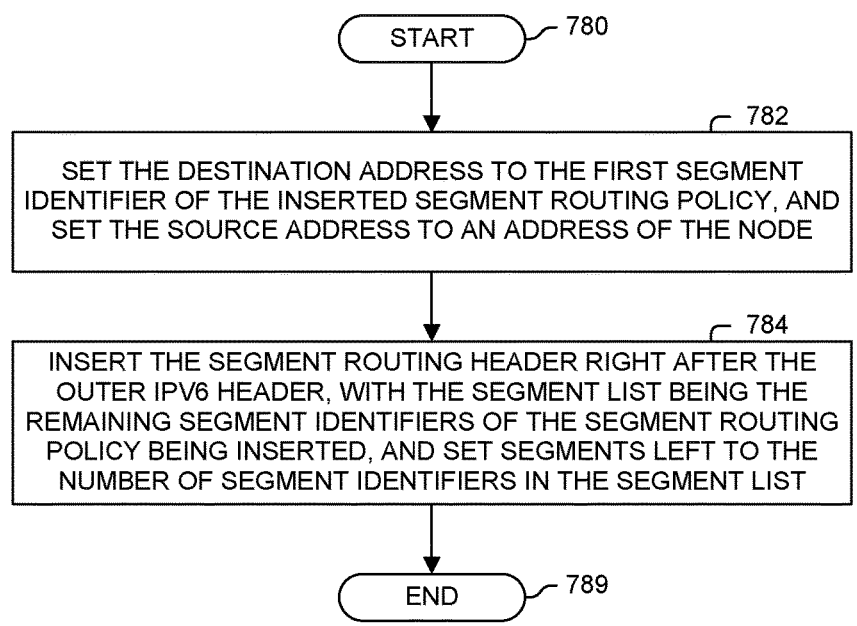
FIG. 7B illustrates a process according to one embodiment.

FIG. 7B illustrates a process according to one embodiment. Processing begins with process block 780. In process block 782, the Source Address of the packet is set to an address of the processing node, and the Destination Address of the packet is set to the first Segment Identifier of the Segment Routing Policy being inserted, but this Segment Identifier is not included in a SR Header being inserted in the received packet. The received packet becomes the payload of the SRv6 packet to be sent. In process block 784, a SR Header is inserted right after the outer IP header, with the remaining Segment Identifiers of the Segment Routing Policy included in the SR Header, with its Segments Left to the number of Segment Identifiers in the SR Header. Processing of the flow diagram of FIG. 7B is complete as indicated by process block 789.

Figure 8A:
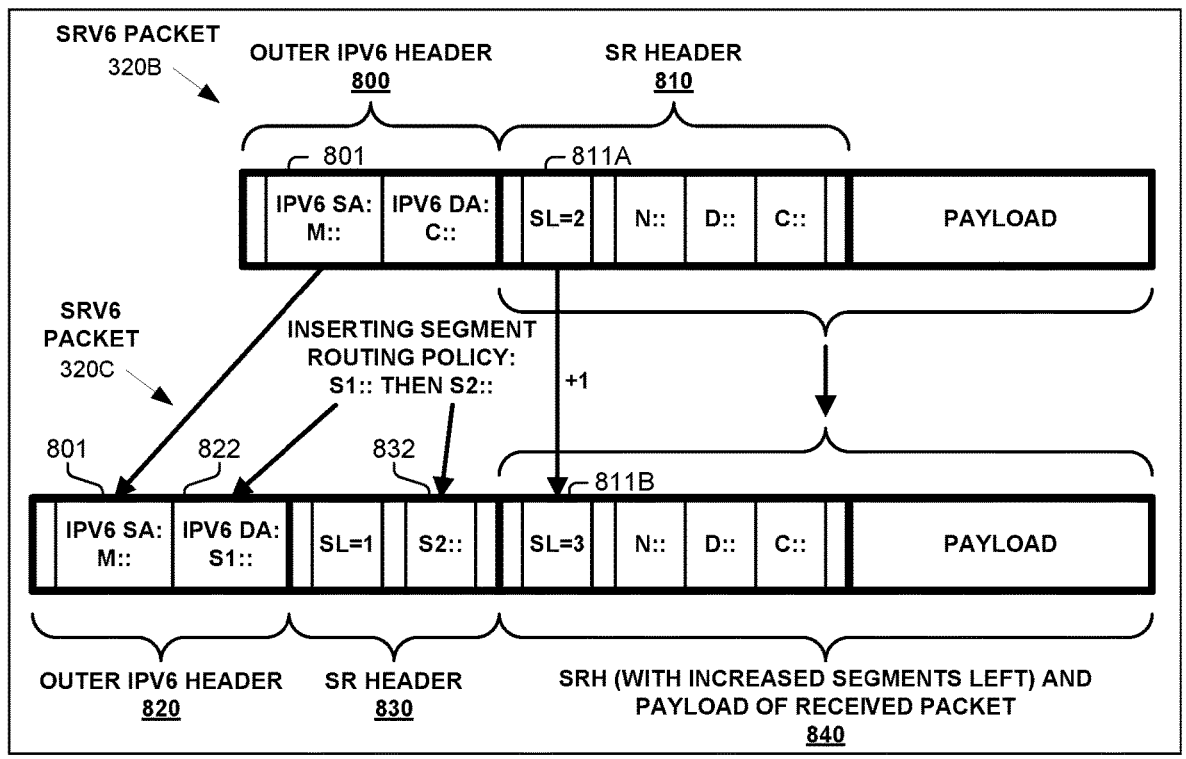
FIG. 8A illustrates packet processing of a packet according to one embodiment.

FIG. 8A illustrates packet processing of a received SRv6 packet 320B according to one embodiment. Received SRv6 packet 320B includes outer IPv6 header 800 that includes Source Address 801; and SR Header 810, that includes three Segment Identifiers and with Segments Left 811A being two (thus pointing to the Segment Identifier having a value of C::). Referring to FIG. 3B, this packet processing is being performed by SR node 332, which does not have a destination address of C::. However, SR node 332 identifies (e.g., based on a lookup operation/packet classification) on packet 320B to add the Segment Routing Policy of S1:: then S2::.

In response, SRv6 packet 320C is generated with its outer IPv6 header 820 including the same Source Address 801 and with its Destination Address 822 set to the first Segment Identifier of the Segment Routing Policy being added. A SR header 830 is added to include the remaining Segment Identifiers 832 of the Segment Routing Policy being added. The remaining portion 840 of packet 320C is SR Header 810 and payload of received SRv6 packet 320B, with the Segments Left 811B being one greater than Segments Left 811A such that SR Header 830 does not need to include the Destination Address of received SRv6 packet 320B as a Segment Identifier (as Segments Left 811B would be two per Segments Left 811A).

Figure 8B:
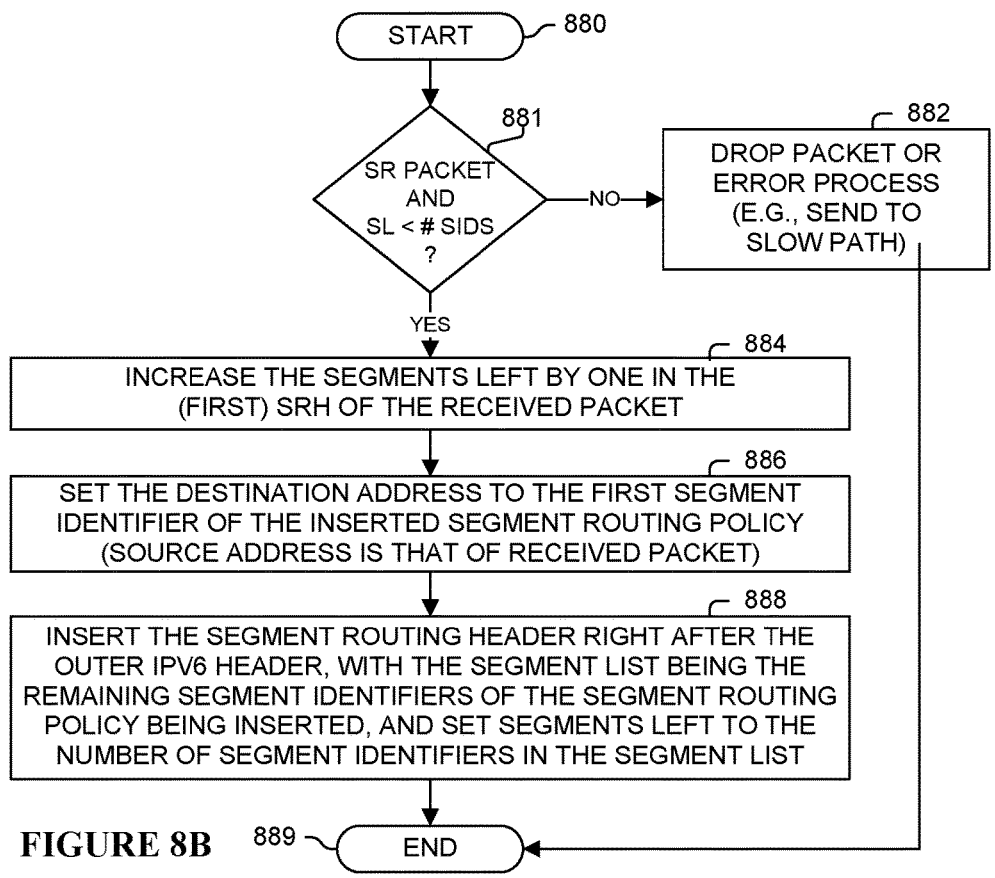
FIG. 8B illustrates a process according to one embodiment.

FIG. 8B illustrates a process according to one embodiment. Processing begins with process block 880. As determined in process block 881, if the packet received includes a (topmost) SR Header and Segments Left is less than the number of Segment Identifiers in this SR Header, then processing proceeds to process block 884; else processing continues to process block 882.

Continuing in process block 884, the Segments Left is increased by one in the topmost/first SR Header of the received packet. In process block 886, the Destination Address of the packet is set to the first Segment Identifier of the Segment Routing Policy being inserted (with the Source Address remaining the same), but this Segment Identifier is not included in a SR Header being inserted in the packet. In process block 888, a SR Header is inserted between the outer IP header and the topmost/first SR Header of the received packet, with the remaining Segment Identifiers of the Segment Routing Policy included in this SR Header, with its Segments Left to the number of Segment Identifiers in this SR Header. Processing proceeds to process block 889.

Continuing in process block 882, the packet is dropped or other error processing is performed. Processing proceeds to process block 889.

Continuing in process block 889, processing of the flow diagram of FIG. 8B is complete.

Figure 8C:
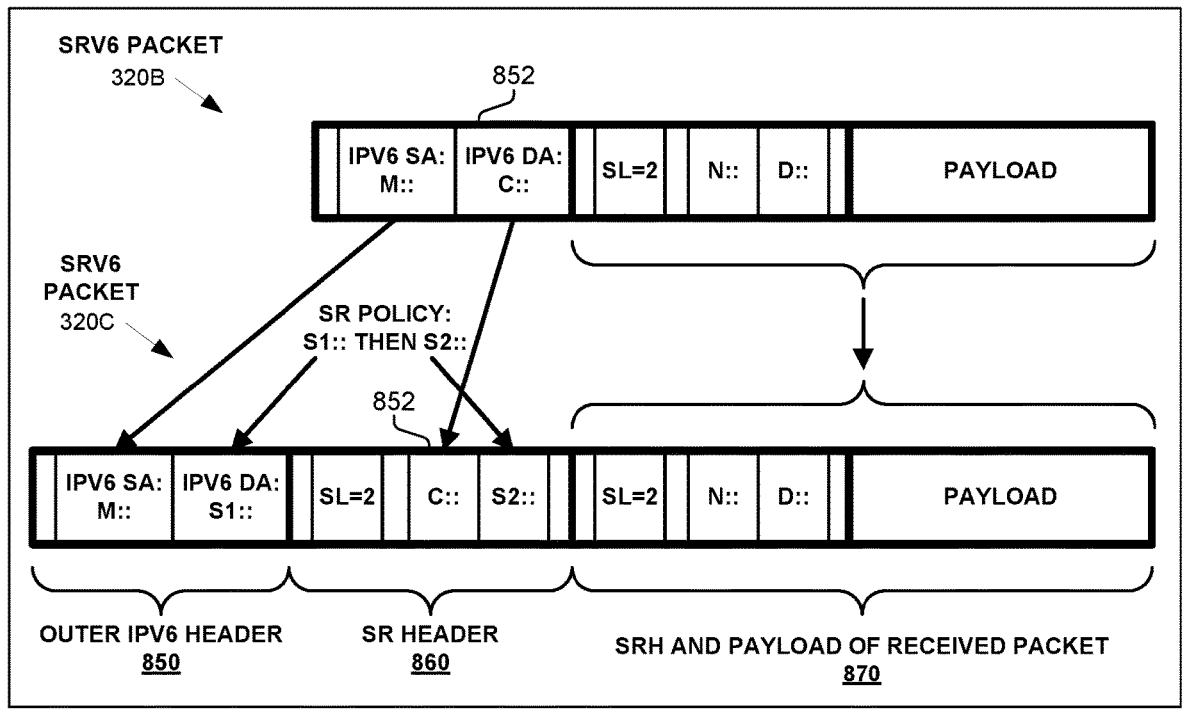
FIG. 8C illustrates packet processing of a packet according to one embodiment.

FIG. 8C illustrates packet processing of a received SRv6 packet 320B according to one embodiment. This processing is very similar to that of FIG. 8A including generation of Outer IPv6 header 850 and SR Header 860, but received packet 320B does not include Destination Address 852 (of value C::) as a Segment Identifier in its SR header. Thus, Destination Address 852 (of value C::) is added to SR Header 860, thus leaving the Segments Left value in the SR Header to be the same as when SRv6 packet 320B was received. The SR Header and payload of received SRv6 packet 320B is used as portion 870 of SRv6 packet 320C.

Figure 8D:
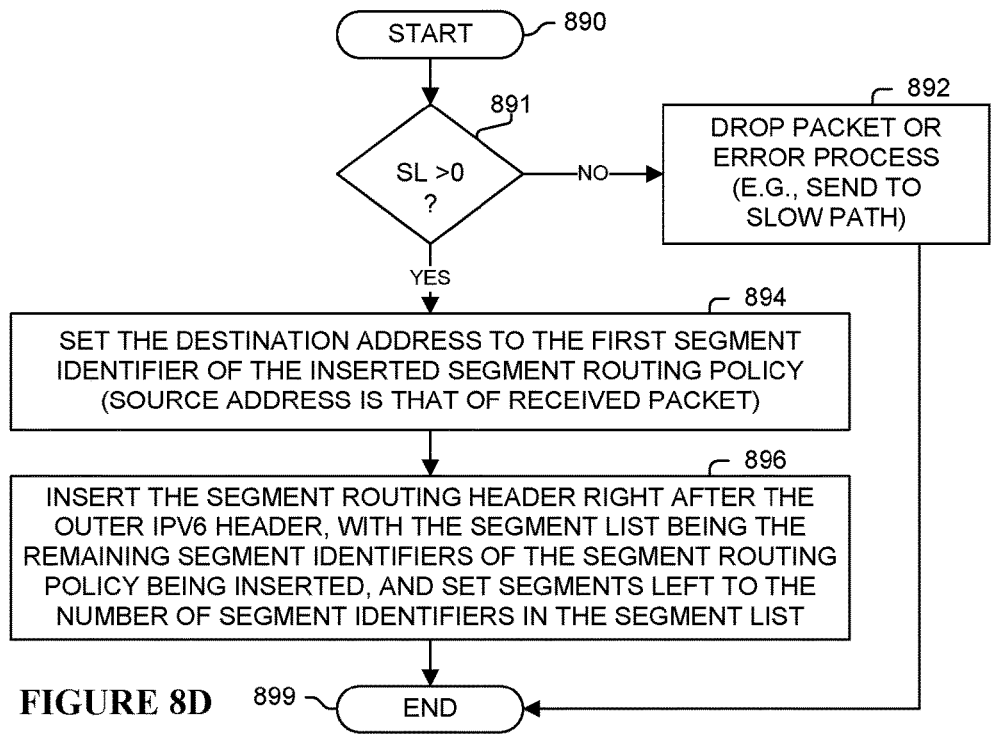
FIG. 8D illustrates a process according to one embodiment.

FIG. 8D illustrates a process according to one embodiment. Processing begins with process block 890. As determined in process block 891, if the Segments Left is greater than zero (in the first/topmost SR Header of received SRv6 packet 320B), then processing proceeds to process block 894; else processing continues to process block 892.

Continuing in process block 894, the Destination Address of the packet is set to the first Segment Identifier of the Segment Routing Policy being inserted (with the Source Address remaining the same), but this Segment Identifier is not included in a SR Header being inserted in the packet. In process block 896, a SR Header is inserted between the outer IP header and the topmost/first SR Header of the received packet, with the remaining Segment Identifiers of the Segment Routing Policy included in this SR Header as well as the Destination Address of the received SRv6 packet, with its Segments Left to the number of Segment Identifiers in this SR Header. Processing proceeds to process block 899.

Continuing in process block 892, the packet is dropped or other error processing is performed. Processing proceeds to process block 899.

Continuing in process block 899, processing of the flow diagram of FIG. 8D is complete.

Figure 9A:
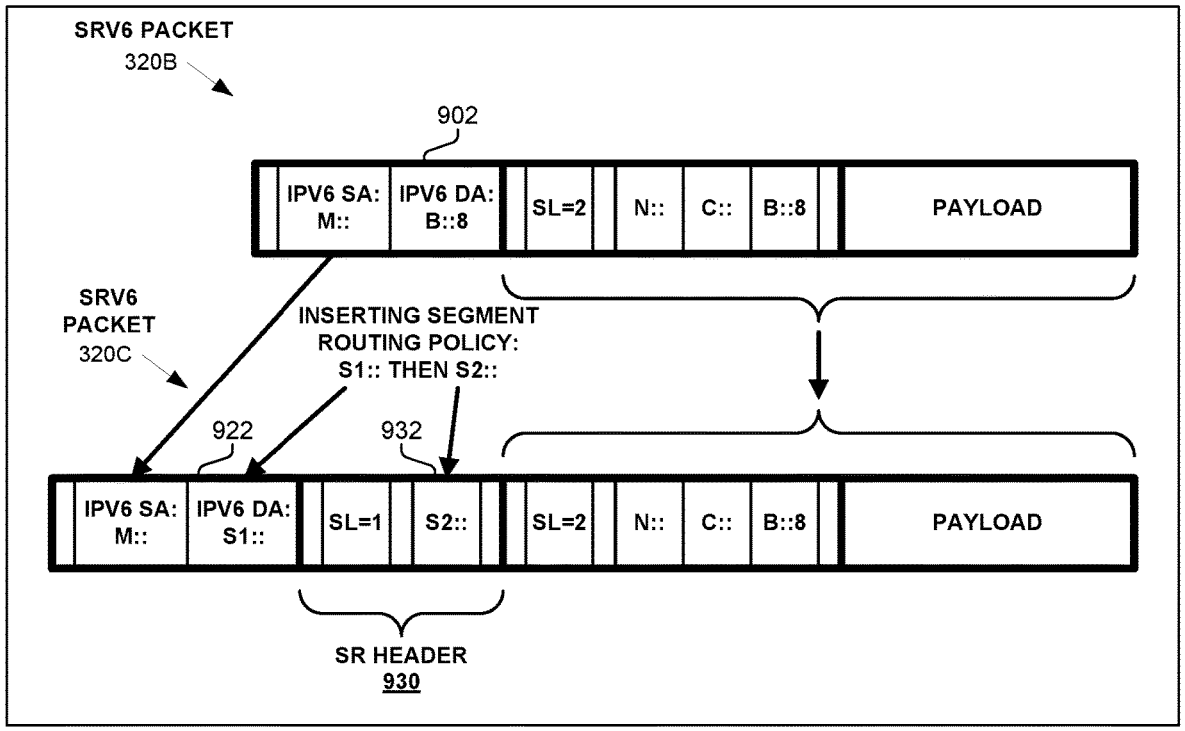
FIG. 9A illustrates packet processing of a packet according to one embodiment.

FIG. 9A illustrates packet processing, according to one embodiment, of a SRv6 packet 320B received by a Segment Routing node having an IP address that is the same as the Destination Address 902 of the received SRv6 packet 320B. The Segment Routing node operates according to a Segment Routing function identified from the Destination Address 902 to add the Segment Routing Policy by setting the Destination Address 922 to the first Segment Identifier of the Segment Routing Policy, and inserting a SR Header 930 containing the remaining Segment Identifier(s) 932 of the Segment Routing Policy, with its Segments Left set to the number of these Segment Identifier(s) 932.

Figure 9B:
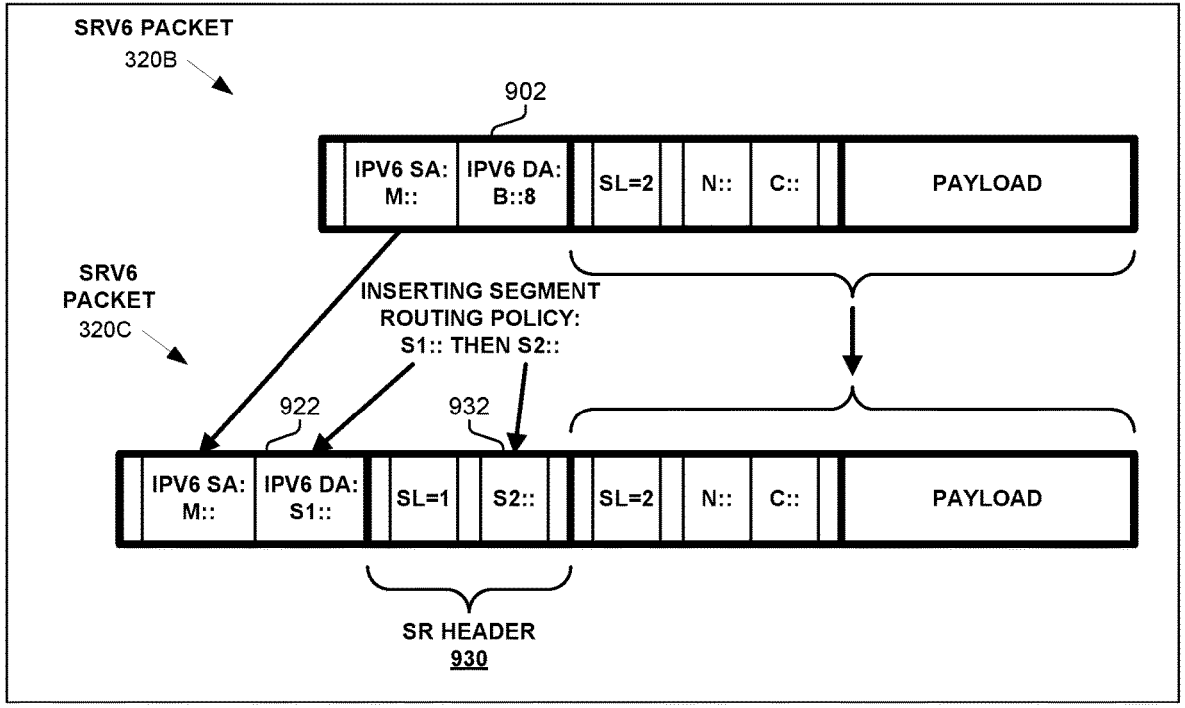
FIG. 9B illustrates packet processing of a packet according to one embodiment.

FIG. 9B illustrates packet processing, according to one embodiment, of a SRv6 packet 320B received by a Segment Routing node having an IP address that is the same as the Destination Address 902 of the received SRv6 packet 320B. Processing is the same as performed in FIG. 9A, despite the SR Header of received SRv6 packet 320B not including a Segment Identifier of the value of Destination Address 902.

Figure 9C:
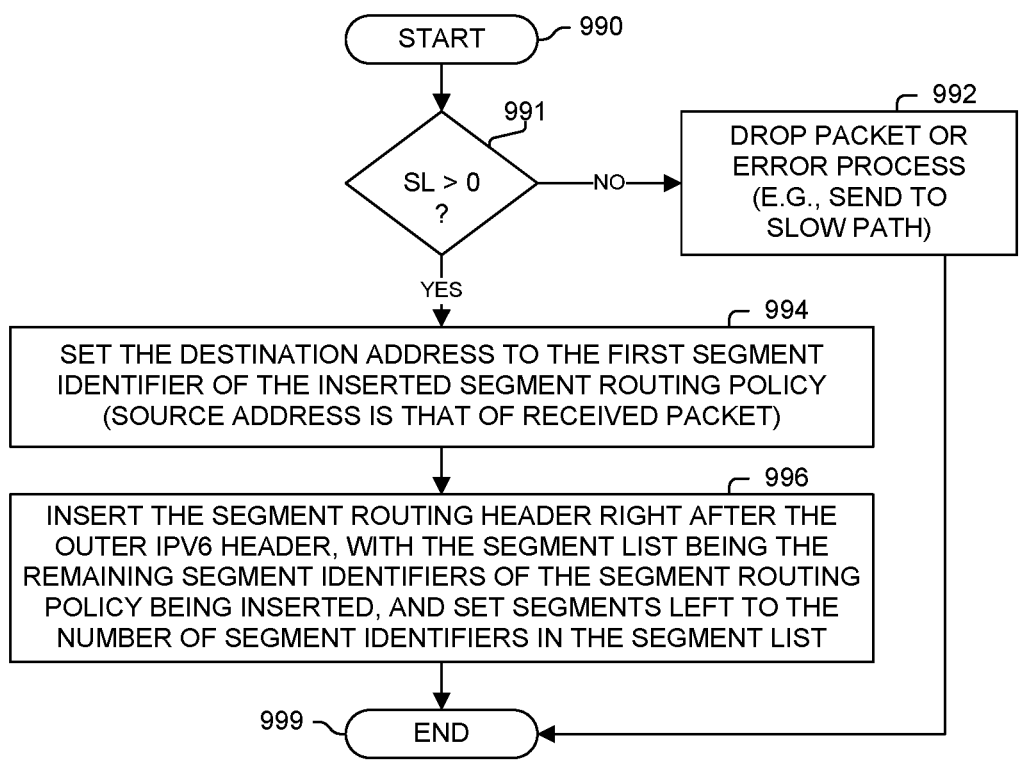
FIG. 9C illustrates a process according to one embodiment.

FIG. 9C illustrates a process according to one embodiment. Processing begins with process block 990. As determined in process block 991, if the Segments Left is greater than zero (in the first/topmost SR Header of received SRv6 packet 320B), then processing proceeds to process block 994; else processing continues to process block 992.

Continuing in process block 994, the Destination Address of the packet is set to the first Segment Identifier of the Segment Routing Policy being inserted (with the Source Address remaining the same), but this Segment Identifier is not included in a SR Header being inserted in the packet. In process block 996, a SR Header is inserted between the outer IP header and the topmost/first SR Header of the received packet, with the remaining Segment Identifiers of the Segment Routing Policy included in this SR Header, with its Segments Left to the number of Segment Identifiers in this SR Header. Processing proceeds to process block 999.

Continuing in process block 992, the packet is dropped or other error processing is performed. Processing proceeds to process block 999.

Continuing in process block 999, processing of the flow diagram of FIG. 9C is complete.

Figure 10A:
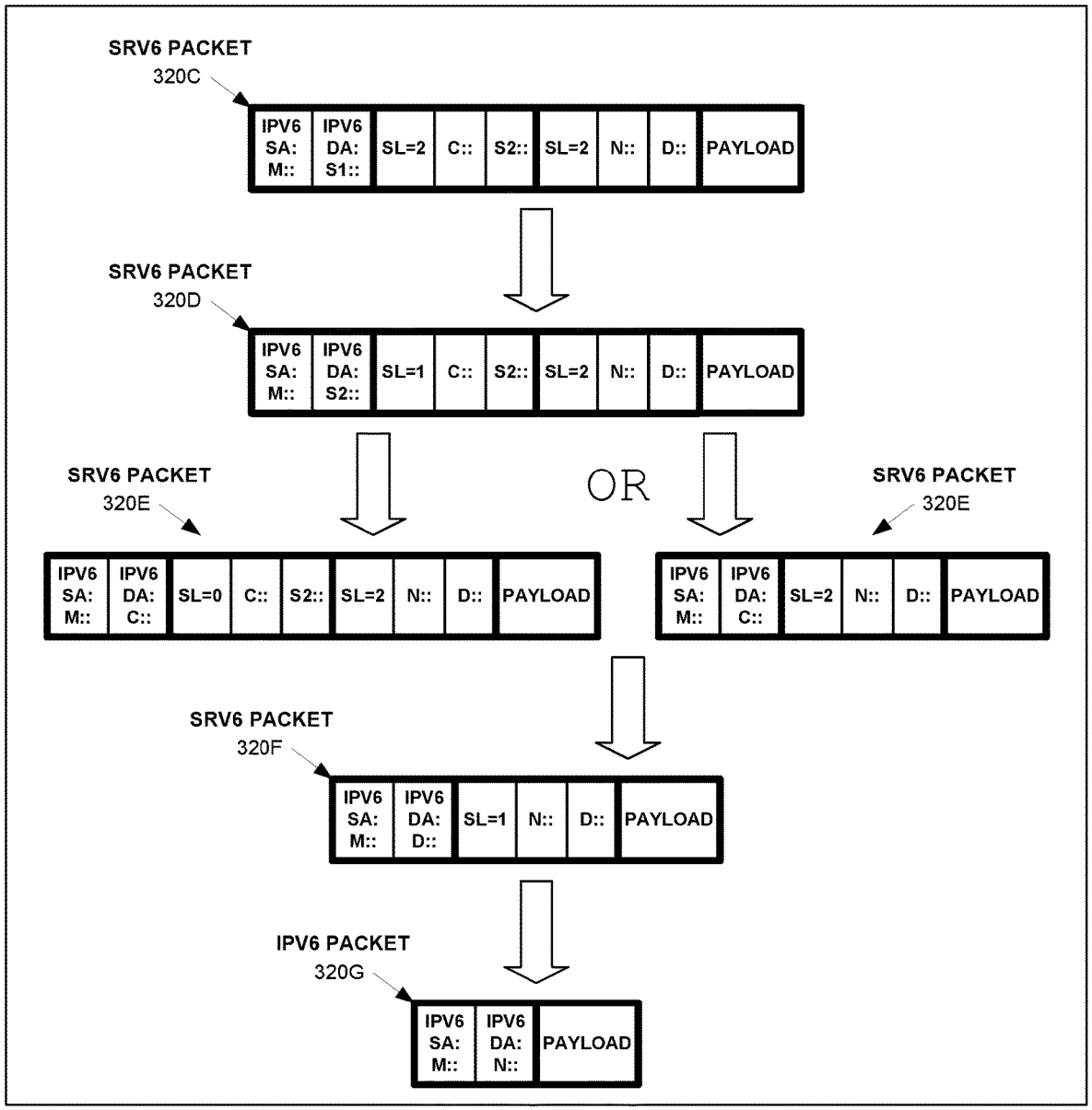
FIG. 10A illustrates packet processing of a packet according to one embodiment.

FIG. 10A illustrates packet processing of a packet according to one embodiment, with reference to network 360 of FIG. 3B.

Node 333 receives and processes SRv6 packet 320C, including sending generated SRv6 packet 320D with Segments Left decreased (by one) with the resulting value used to identify the corresponding Segment Identifier which is used as the Destination Address of SRv6 packet 320D.

Node 334 receives and processes SRv6 packet 320D, including sending generated SRv6 packet 320E. In one embodiment (and shown on the left), Segments Left is decreased (by one) with the resulting value used to identify the corresponding Segment Identifier which is used as the Destination Address of SRv6 packet 320E. In one embodiment (and shown on the right), penultimate segment popping of the first/topmost SR Header is further performed on SRv6 packet 320E before sending to remove the no longer need SR Header.

Node 335 receives and processes SRv6 packet 320E, including sending generated SRv6 packet 320F, with Segments Left decreased (by one) with the resulting value used to identify the corresponding Segment Identifier which is used as the Destination Address of SRv6 packet 320F.

Node 336 receives and processes SRv6 packet 320F, including sending decapsulated IPv6 packet 320G. Segments Left of received SRv6 packet 320F is decreased (by one) with the resulting value used to identify the corresponding Segment Identifier which is used as the Destination Address of SRv6 packet 320G. Further, as node 336 is an edge node of provider network 330, node 336 will perform penultimate segment popping of the SR Header thus producing IPv6 packet 320G.

Figure 10B:
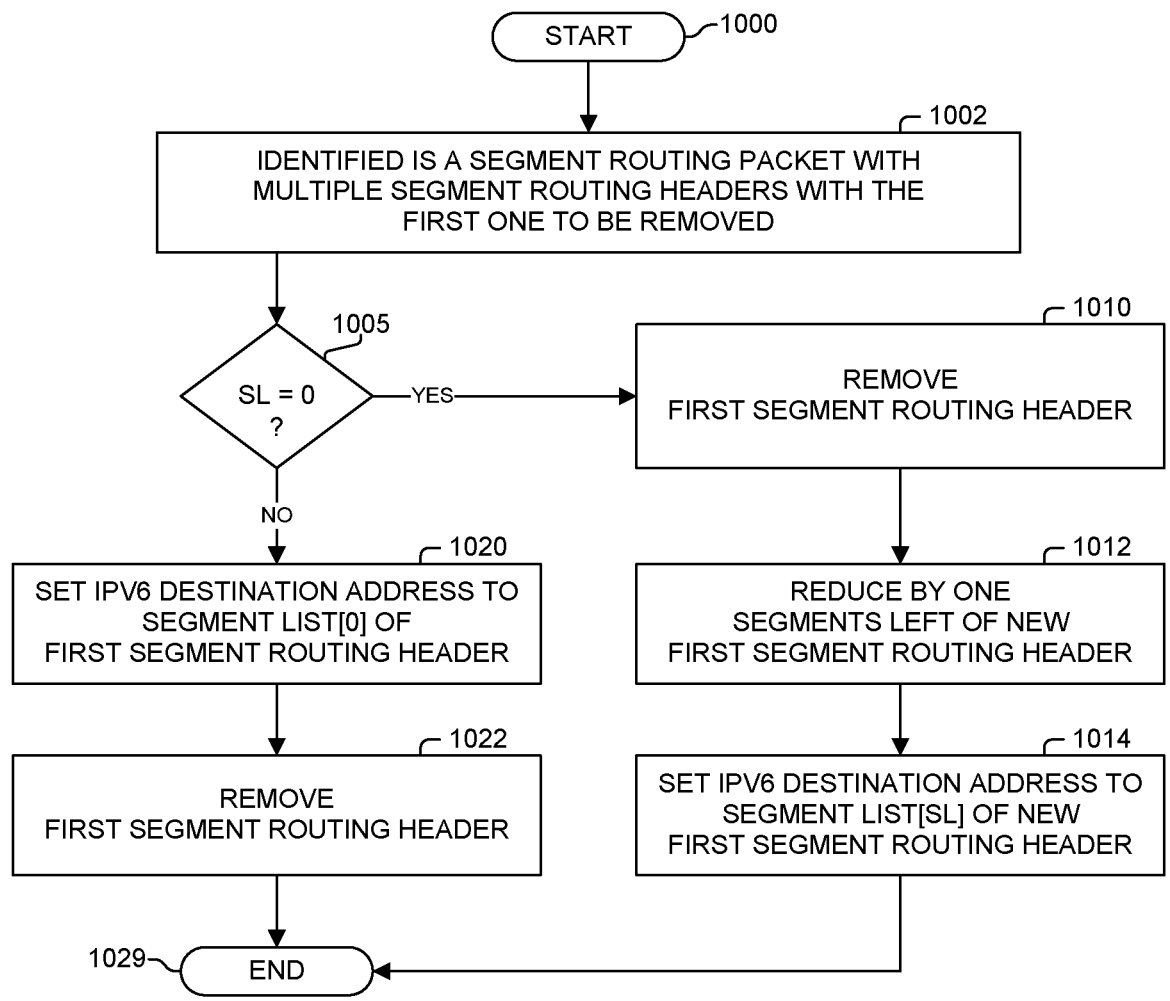
FIG. 10B illustrates a process according to one embodiment.

FIG. 10B illustrates a process according to one embodiment to remove a no longer needed SR Header of a packet with multiple SR Headers. Processing begins with process block 1000. In process block 1002, a Segment Routing packet is identified that has multiple SR Headers with the first/topmost SR Header to be removed. As determined in process block 1005, if the Segments Left of the first/topmost SR Header is equal to zero, then processing proceeds to process block 1010; otherwise, processing proceeds to process block 1020.

Continuing in process block 1010, the first SR Header is removed. In process block 1012, the Segments Left in the new first/topmost SR Header is decreased by one. In process block 1014, the Destination Address in the outer IP header is set to the value of the Segment Identifier at the position Segments Left in the Segment List of the new first/topmost SR Header (possibly the only SR header remaining). Processing proceeds to process block 1029.

Continuing in process block 1020, the Destination Address in the outer IP header is set to the value of the Segment Identifier at the position zero of the current first/topmost SR Header. In process block 1022, the first SR Header is removed. Processing proceeds to process block 1029

Continuing in process block 1029, processing of the flow diagram of FIG. 10B is complete.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   receiving a particular Segment Routing (SR) packet by a particular node in a network, wherein as received, the particular SR packet includes: an outer Internet Protocol (IP) header with an IP Destination Address having a value of a particular IP address of the particular node, a first SR Header (SRH), and a second SRH, with the first SRH including a first Segments Left value and a first Segment List including a particular Segment Identifier having a value of the particular IP address, and with the second SRH including a second Segments Left value of at least one and a second Segment List including one or more second Segment Identifiers; and
   particular processing of the particular SR packet by the particular node, with said particular processing including removing the first SRH and updating the IP Destination Address to a specific Segment Identifier from said one or more second Segment Identifiers in the second Segment List, and sending the particular SR packet from the particular node; wherein said sent particular SR packet includes the second SRH but does not include the first SRH.

2. The method of claim 1, wherein when the particular SR packet is received by the particular node, the first Segments Left value is one and the first Segment List includes the specific Segment Identifier identified at a position identified by the first Segments Left value; and wherein said updating the IP Destination Address acquires the specific Segment Identifier from the first Segment List.

3. The method of claim 2, wherein when the particular SR packet is received by the particular node, the first Segment List includes a plurality of Segment Identifiers.

4. The method of claim 2, wherein the second Segment Left value is the same in said received particular SR packet and said sent particular SR packet.

5. The method of claim 2, comprising the particular node advertising to one or more other nodes in the network a particular route associated with the particular IP address and the capability of the Segment Routing capability of Penultimate Segment Pop (PSP) of a SRH.

6. The method of claim 5, wherein said advertising is performed using Border Gateway Protocol (BGP).

7. The method of claim 1, wherein when the particular SR packet is received by the particular node, the first Segments Left value is zero and the second Segment List includes the specific Segment Identifier identified at a position identified by the second Segments Left value; and wherein said updating the IP Destination Address acquires the specific Segment Identifier from the second Segment List.

8. The method of claim 7, wherein when the particular SR packet is received by the particular node, the second Segment List includes a plurality of Segment Identifiers.

9. The method of claim 7, wherein the second Segment Left value in said sent particular SR packet is one less than the second Segment Left value in said received particular SR packet.

10. The method of claim 7, comprising the particular node advertising to one or more other nodes in the network a particular route associated with the particular IP address and the capability of the Segment Routing capability of Ultimate Segment Pop (USP) of a SRH.

11. The method of claim 10, wherein said advertising is performed using Border Gateway Protocol (BGP).

12. An apparatus, comprising:
    one or more hardware interfaces communicatively coupled to a network; and
    one or more network processors with memory associated therewith;
    wherein the apparatus, communicatively coupled to a network, performs packet processing operations including Segment Routing-capable (SR-capable) packet processing operations, with said packet processing operations including:
    receiving a particular Segment Routing (SR) packet, wherein as received, the particular SR packet includes: an outer Internet Protocol (IP) header with an IP Destination Address having a value of a particular IP address of the apparatus, a first SR Header (SRH), and a second SRH, with the first SRH including a first Segments Left value and a first Segment List including a particular Segment Identifier having a value of the particular IP address, and with the second SRH including a second Segments Left value of at least one and a second Segment List including one or more second Segment Identifiers; and
    removing the first SRH, updating the IP Destination Address to a specific Segment Identifier from said one or more second Segment Identifiers in the second Segment List, and sending the particular SR packet from the apparatus; wherein said sent particular SR packet includes the second SRH but does not include the first SRH.

13. The apparatus of claim 12, wherein when the particular SR packet is received by the apparatus, the first Segments Left value is one and the first Segment List includes the specific Segment Identifier identified at a position identified by the first Segments Left value; and wherein said updating the IP Destination Address acquires the specific Segment Identifier from the first Segment List.

14. The apparatus of claim 13, wherein the second Segment Left value is the same in said received particular SR packet and said sent particular SR packet.

15. The apparatus of claim 13, comprising the apparatus advertising to one or more other nodes in the network a particular route associated with the particular IP address and the capability of the Segment Routing capability of Penultimate Segment Pop (PSP) of a SRH.

16. The apparatus of claim 15, wherein said advertising is performed using Border Gateway Protocol (BGP).

17. The apparatus of claim 12, wherein when the particular SR packet is received by the apparatus, the first Segments Left value is zero and the second Segment List includes the specific Segment Identifier identified at a position identified by the second Segments Left value; and wherein said updating the IP Destination Address acquires the specific Segment Identifier from the second Segment List.

18. The apparatus of claim 17, wherein the second Segment Left value in said sent particular SR packet is one less than the second Segment Left value in said received particular SR packet.

19. The apparatus of claim 17, comprising the apparatus advertising to one or more other nodes in the network a particular route associated with the particular IP address and the capability of the Segment Routing capability of Ultimate Segment Pop (USP) of a SRH.

20. The apparatus of claim 19, wherein said advertising is performed using Border Gateway Protocol (BGP).

* * * * *